(12) United States Patent
Faibish et al.

(10) Patent No.: US 10,853,325 B2
(45) Date of Patent: Dec. 1, 2020

(54) TECHNIQUES FOR OPTIMIZING DATA REDUCTION BY UNDERSTANDING APPLICATION DATA

(71) Applicant: EMC IP Holding Company LLC, Hopkinton, MA (US)

(72) Inventors: Sorin Faibish, Newton, MA (US); Ronald A. Miller, II, Raleigh, NC (US); James M. Pedone, Jr., West Boylston, MA (US); Ivan Bassov, Brookline, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 219 days.

(21) Appl. No.: 16/174,857

(22) Filed: Oct. 30, 2018

(65) Prior Publication Data
US 2020/0134048 A1    Apr. 30, 2020

(51) Int. Cl.
*G06F 16/00* (2019.01)
*G06F 16/174* (2019.01)

(52) U.S. Cl.
CPC ...... *G06F 16/1748* (2019.01); *G06F 16/1744* (2019.01)

(58) Field of Classification Search
None
See application file for complete search history.

(56) References Cited

U.S. PATENT DOCUMENTS

| | | | | |
|---|---|---|---|---|
| 8,332,612 B1* | 12/2012 | Raizen | ................. | G06F 3/0689 |
| | | | | 711/202 |
| 9,767,154 B1* | 9/2017 | Wallace | ............. | H03M 7/3091 |
| 10,073,853 B2* | 9/2018 | Aronovich | .......... | G06F 16/1752 |
| 10,120,587 B2* | 11/2018 | Aron | ..................... | G06F 3/0643 |
| 10,430,079 B2* | 10/2019 | Colgrove | ............... | G06F 3/067 |
| 2019/0379394 A1* | 12/2019 | Hallak | .................. | G06F 16/137 |

OTHER PUBLICATIONS

Sorin Faibish, et al, "Techniques for Assessing Data Reduction Efficiency", U.S. Appl. No. 16/035,867, filed Jul. 16, 2018.

* cited by examiner

*Primary Examiner* — Debbie M Le
(74) *Attorney, Agent, or Firm* — Muirhead and Saturnelli, LLC

(57) ABSTRACT

Techniques for determining data reduction options may include: receiving first data reduction information regarding compression and deduplication of chunks of a data set; determining, in accordance with the first data reduction information for the data set, first settings denoting whether compression and deduplication are enabled or disabled for the data set; receiving, during a first time period when the first settings are effective, writes directed to the data set; receiving second data reduction information regarding compression and deduplication of chunks of the data set modified by writes during the first time period; and determining, in accordance with the second plurality of data reduction statistics for the data set, second settings denoting whether compression and deduplication are enabled or disabled for the data set. Data reduction information about the data set may include histograms regarding compressed sizes and detected duplications and may include data reduction information regarding different data set regions.

20 Claims, 14 Drawing Sheets

| Dataset type 302a | Application type | Inline compression only Pc 302b | Deduplication only Pd 302c | Deduplication and compression Pd 302d |
|---|---|---|---|---|
| File services/IT infrastructure | | 50% | 30% | 65% |
| Virtual servers and desktops (Boot volumes) | | 55% | 70% | 70% |
| Database | Oracle® OLTP | 65% | 0% | 65% |
| | Oracle® DW | 70% | 15% | 70% |
| E-mail, Collaborative | Microsoft® Exchange 2003/2007 | 35% | 3% | 35% |
| | Microsoft® Exchange 2010 | 35% | 15% | 40% |
| Engineering data | | 55% | 30% | 75% |
| Geoseismic | | 40% | 3% | 40% |
| Archival data | | Archive application dependent | 25% | Archive application dependent |
| Backup data | | Backup application dependent | 95% | Backup application dependent |

FIG. 4

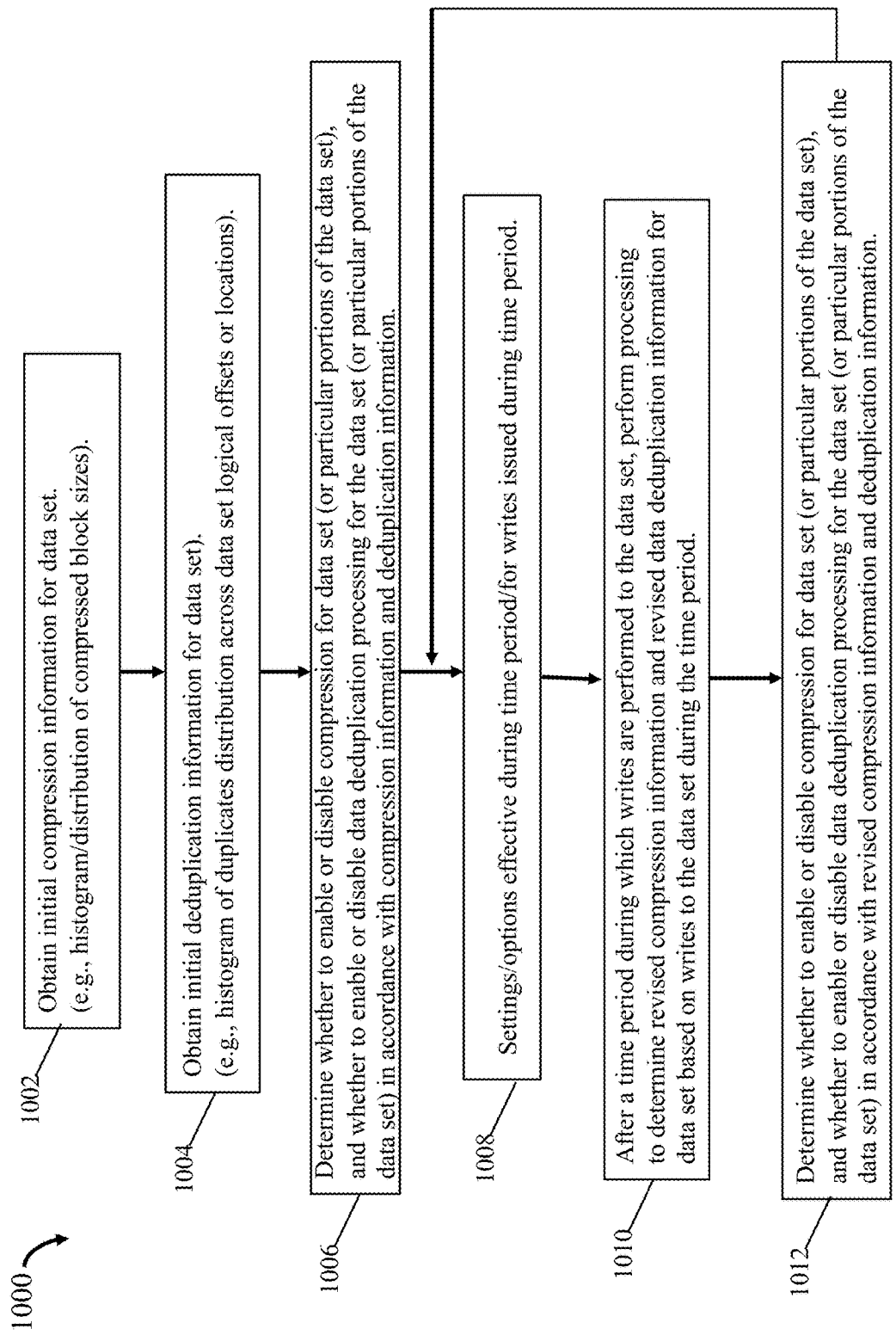

TECHNIQUES FOR OPTIMIZING DATA REDUCTION BY UNDERSTANDING APPLICATION DATA

BACKGROUND

Technical Field

This application generally relates to performing data reduction techniques.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell EMC™. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell EMC™. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of determining data reduction options for data sets comprising: receiving first data reduction information for a data set, wherein the first data reduction information includes first compression information regarding compression of chunks of the data set, wherein the first data reduction information includes first deduplication information regarding deduplication of chunks of the data set; determining, in accordance with the first data reduction information for the data set, first settings denoting whether compression is enabled or disabled for the data set and denoting whether deduplication is enabled or disabled for the data set; receiving, during a first time period when the first settings are effective, a plurality of writes directed to the data set, wherein the plurality of writes modify a plurality of chunks of the data set; receiving second data reduction information for the data set, wherein the second data reduction information includes second compression information regarding compression of the plurality of chunks of the data set modified by the plurality of writes during the first time period, wherein the second data reduction information includes second deduplication information regarding deduplication of the plurality of chunks of the data set modified by the plurality of writes during the first time period; and determining, in accordance with the second data reduction information for the data set, second settings denoting whether compression is enabled or disabled for the data set and denoting whether deduplication is enabled or disabled for the data set. The method may include receiving, during a second time period when the second settings are effective, a second plurality of writes directed to the data set, wherein the second plurality of writes modify a second plurality of chunks of the data set; receiving third data reduction information for the data set, wherein the third data reduction information includes third compression information regarding compression of the second plurality of chunks of the data set modified by the second plurality of writes during the second time period, wherein the third data reduction information includes third deduplication information regarding deduplication of the second plurality of chunks of the data set modified by the second plurality of writes during the second time period; and determining, in accordance with the third data reduction information for the data set, third settings denoting whether compression is enabled or disabled for the data set and denoting whether deduplication is enabled or disabled for the data set. The first compression information may include a histogram denoting frequencies of different compressed chunk sizes in the data set; and wherein the second compression information includes a histogram denoting frequencies of different compressed chunk sizes for the first plurality of chunks modified by the first plurality of writes during the first time period. The first compression information may identify compressed chunk sizes for chunks at different logical locations or offsets in the data set, and wherein the second compression information includes identifies compressed chunk sizes for the first plurality of chunks modified by the first plurality of writes during the first time period. The first deduplication information may include a histogram denoting frequencies of duplicates at different logical locations or offsets in the data set, and wherein the second deduplication information may include a histogram denoting frequencies of duplicates at different logical locations or offsets in the data set modified by the first plurality of writes during the first time period. Deduplication, when enabled, may or may not be performed as processing of an I/O path when writing to the data set. Compression, when enabled, may or may not be performed as processing of the I/O path when writing to the data set. The method may include displaying, on a user interface at a first point in time based on the first data reduction information, a diagram illustrating data reduction benefits for the data set; providing, in accordance with the first data reduction information for the data set, recommended data reduction options for the data set; and receiving, via the user interface, a first input identifying the first settings as current data reduction options selected for the data set. The method may include displaying, on the user interface at a second point in time based on the second data reduction information, a diagram illustrating revised data reduction benefits for the data set based on chunks modified by the first plurality of writes in the first time period providing, in accordance with the second data reduction information for the data set, recommended data reduction options for the data set; and receiving, via the user interface, a second input identifying the second settings as revised data reduction options selected for the data set. The first settings may indicate, for each of a plurality of data portions of the data set, whether compression is enabled or disabled individually for said each portion and whether deduplication is enabled or disabled individually for said each portion. The data set may be a first data set included as a first portion of a second data set larger than the first data set, and the method may include partitioning the second data set into a plurality of portions each having a different logical address subrange of locations in the second data set. The method may include taking a snapshot of the data set at the end of the first time period, wherein the snapshot is a point in time logical copy of the data set at the end of the first time period after the plurality of writes are issued to the data set; and determining the second reduction information using the snapshot of the data set.

In accordance with another aspect of techniques herein is a system comprising: a processor; and a memory comprising code stored thereon that, when executed, perform a method of determining data reduction options for data sets comprising: receiving first data reduction information for a data set, wherein the first data reduction information includes first compression information regarding compression of chunks of the data set, wherein the first data reduction information includes first deduplication information regarding deduplication of chunks of the data set; determining, in accordance with the first data reduction information for the data set, first settings denoting whether compression is enabled or disabled for the data set and denoting whether deduplication is enabled or disabled for the data set; receiving, during a first time period when the first settings are effective, a plurality of writes directed to the data set, wherein the plurality of writes modify a plurality of chunks of the data set; receiving second data reduction information for the data set, wherein the second data reduction information includes second compression information regarding compression of the plurality of chunks of the data set modified by the plurality of writes during the first time period, wherein the second data reduction information includes second deduplication information regarding deduplication of the plurality of chunks of the data set modified by the plurality of writes during the first time period; and determining, in accordance with the second data reduction information for the data set, second settings denoting whether compression is enabled or disabled for the data set and denoting whether deduplication is enabled or disabled for the data set.

In accordance with another aspect of techniques herein is a computer readable medium comprising code stored thereon that, when executed, performs a method of determining data reduction options for data sets comprising: receiving first data reduction information for a data set, wherein the first data reduction information includes first compression information regarding compression of chunks of the data set, wherein the first data reduction information includes first deduplication information regarding deduplication of chunks of the data set; determining, in accordance with the first data reduction information for the data set, first settings denoting whether compression is enabled or disabled for the data set and denoting whether deduplication is enabled or disabled for the data set; receiving, during a first time period when the first settings are effective, a plurality of writes directed to the data set, wherein the plurality of writes modify a plurality of chunks of the data set; receiving second data reduction information for the data set, wherein the second data reduction information includes second compression information regarding compression of the plurality of chunks of the data set modified by the plurality of writes during the first time period, wherein the second data reduction information includes second deduplication information regarding deduplication of the plurality of chunks of the data set modified by the plurality of writes during the first time period; and determining, in accordance with the second data reduction information for the data set, second settings denoting whether compression is enabled or disabled for the data set and denoting whether deduplication is enabled or disabled for the data set. The method may include receiving, during a second time period when the second settings are effective, a second plurality of writes directed to the data set, wherein the second plurality of writes modify a second plurality of chunks of the data set; receiving third data reduction information for the data set, wherein the third data reduction information includes third compression information regarding compression of the second plurality of chunks of the data set modified by the second plurality of writes during the second time period, wherein the third data reduction information includes third deduplication information regarding deduplication of the second plurality of chunks of the data set modified by the second plurality of writes during the second time period; and determining, in accordance with the third data reduction information for the data set, third settings denoting whether compression is enabled or disabled for the data set and denoting whether deduplication is enabled or disabled for the data set. The first compression information may include a histogram denoting frequencies of different compressed chunk sizes in the data set; and wherein the second compression information may include a histogram denoting frequencies of different compressed chunk sizes for the first plurality of chunks modified by the first plurality of writes during the first time period. The first compression information may identify compressed chunk sizes for chunks at different logical locations or offsets in the data set, and wherein the second compression information may identify compressed chunk sizes for the first plurality of chunks modified by the first plurality of writes during the first time period. The first deduplication information may include a histogram denoting frequencies of duplicates at different logical locations or offsets in the data set, and wherein the second deduplication information may include a histogram denoting frequencies of duplicates at different logical locations or offsets in the data set modified by the first plurality of writes during the first time period.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of a table of data reduction statistic values for different data sets in an embodiment in accordance with techniques herein;

FIGS. 7 and 11 are flowcharts of processing steps that may be performed in an embodiment in accordance with techniques herein.

DETAILED DESCRIPTION OF EMBODIMENT(S)

Figure 1:
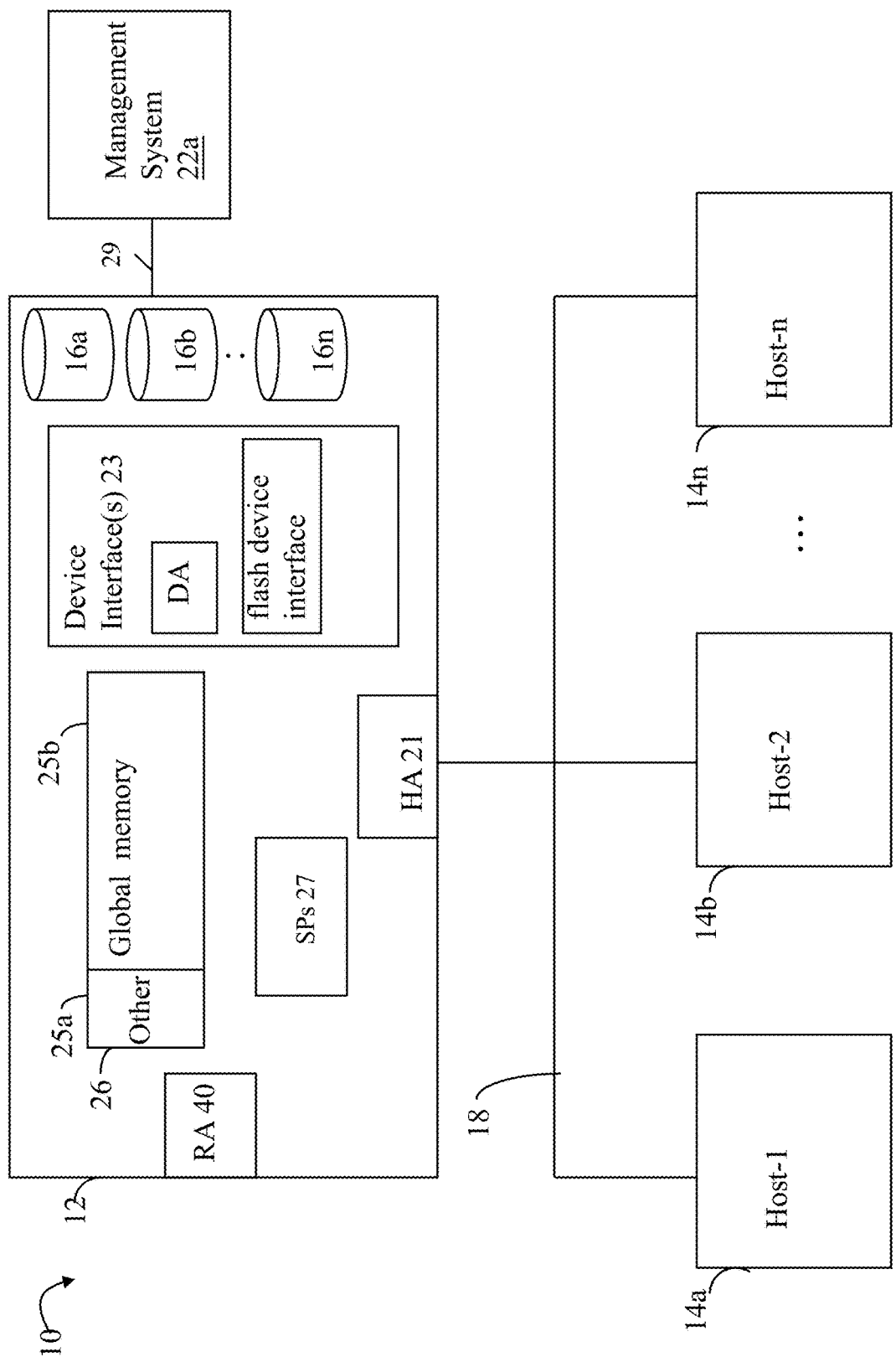
FIGS. 1 and 2B are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell EMC™. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. The flash devices may be constructed, for example, using nonvolatile semiconductor NAND flash memory.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular storage device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a data storage array reference or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services, such as encryption. Such data reduction operations attempt to reduce the amount of storage needed for storing data on non-volatile backend storage devices with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data blocks or chunks whereby only a single instance of the data block or chunk is retained (stored on physical storage) and where pointers or references may be used in connection with duplicate or redundant copies (which reference or identify the single stored instance of the data block).

Figure 2A:
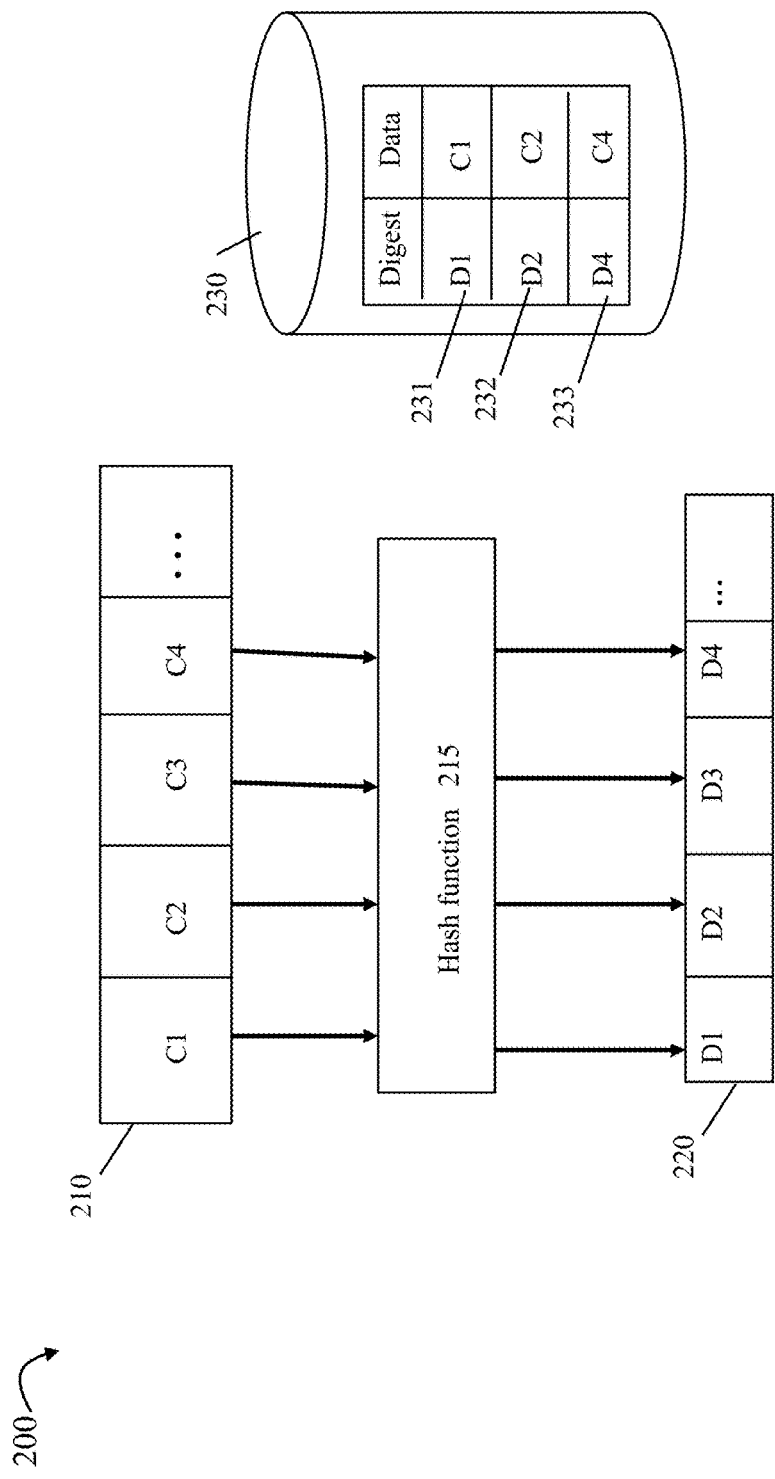
FIG. 2A is an example illustrating data deduplication as may be performed in an embodiment in accordance with techniques herein.

Referring to FIG. 2A, shown is an example 200 illustrating processing that may be performed in connection with data deduplication processing in an embodiment in accordance with techniques herein. Element 210 may denote the original data being written or stored on back-end non-volatile storage. The original data may be partitioned into multiple data blocks or chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic hashing function known in the art. For each chunk of 210, the hash function 215 may perform processing and generate, as an output, a hash value or digest. Element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks or blocks). If two chunks, such as C1 and C4, have different digests whereby D1 does not equal D4, then chunks C1 and C4 do not match (e.g., are different or non-matching data chunks or blocks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

Element 230 of FIG. 2A may denote the data store used to store data chunks. In this example, as noted above, assume chunks C1 and C3 are the same with remaining chunks C2 and C4 being unique. The data store 230 may also be referred to as a single instance store (SIS). In at least one embodiment, element 230 may be organized and managed using a data structure, such as a hash table. In at least one embodiment, computed digests may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data such as the file to its original form, the handle or reference into the hash table for chunk C3 may be used to obtain the actual C3 chunk of data from 230.

Figure 2B:
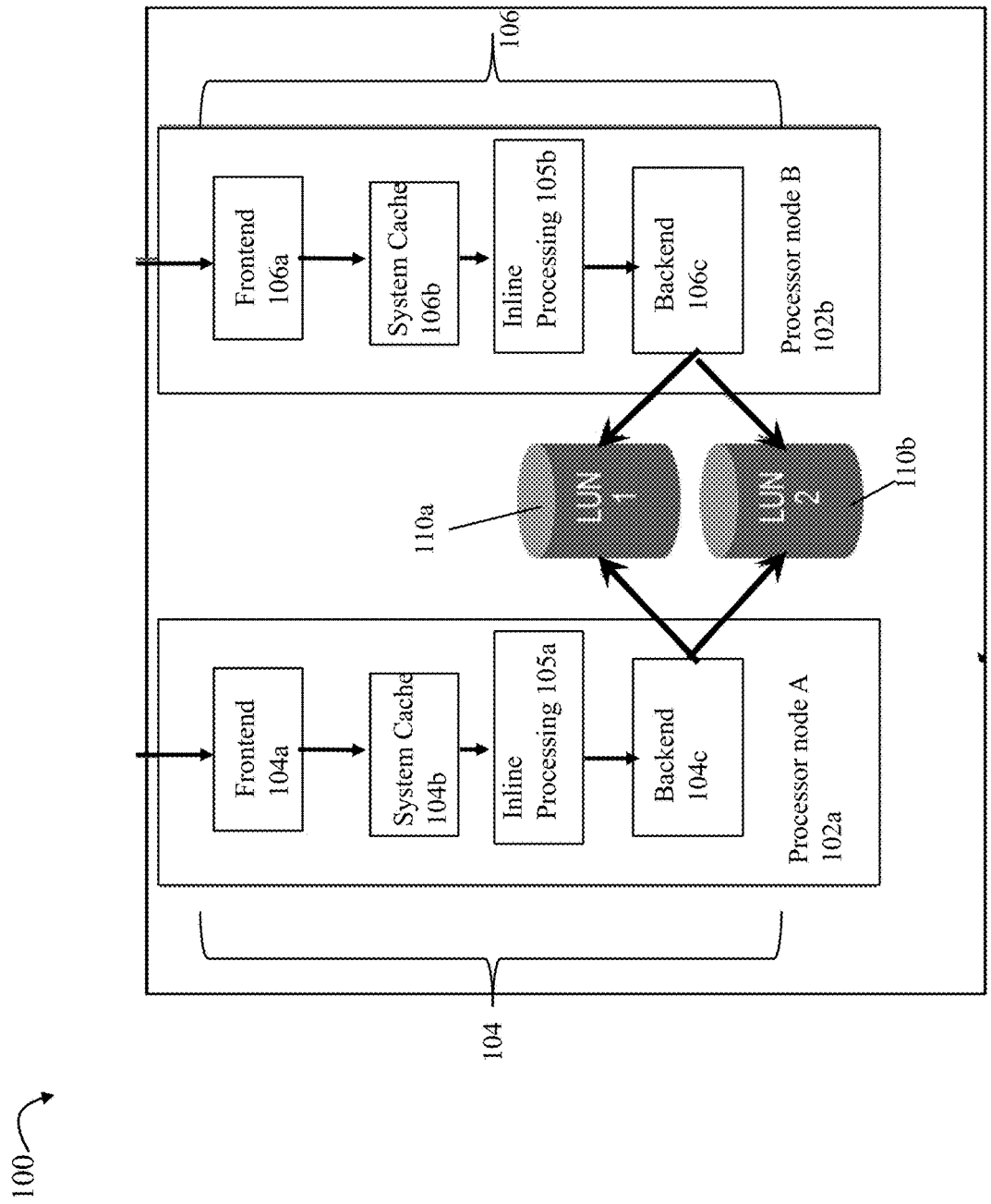

With reference to FIG. 2B, shown is an example 100 illustrating components that may be included in the data path in at least one existing data storage system in accordance with techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b (e.g., PDs), inline processing may be performed by layer 105a. Such inline processing operations of 105a may be optionally performed and may include any one of more data processing operations in connection with data that is flushed from system cache layer 104b to back-end non-volatile physical storage 110a, 110b, as well as when retrieving data from back-end non-volatile physical storage 110a, 110b to be stored in system cache layer 104b. In at least one embodiment, the inline processing may include performing compression and/or data duplication.

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned the host (e.g., by component 104a). At various points in time, WP data stored in the system cache is flushed or written out to physical storage 110a, 110b.

In connection with inline processing layer 105a, prior to storing the original data on physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment in which both deduplication and compression are enabled for use in connection with writing data, when deduplication processing determines that a portion (such as a block or chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). As a variation, an embodiment in accordance with techniques herein may only enable compression/decompression without enabling data deduplication. As yet another variation, an embodiment in accordance with techniques herein may only enable data deduplication without enabling compression/decompression.

In connection with a read operation to read a block or chunk of data, a determination is made as to whether the requested read data block is stored in its original form (in system cache 104b or on physical storage 110a, 110b), or whether the requested read data block was previously deduplicated or compressed. If the requested read data block (which is stored in its original decompressed, non-deduplicated form) is in system cache, the read data block is retrieved from the system cache 104b and returned to the host. Otherwise, if the requested read data block is not in system cache 104b but is stored on physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. If the requested read data was previously compressed, the block is first decompressed prior to sending the read data block to the host. If the compressed read data block is already stored in the system cache, the data is uncompressed to a temporary or buffer location, the uncompressed data is sent to the host, and the buffer or temporary location is released. If the compressed read data block is not in system cache but stored on physical storage 110a, 110b, the compressed read data block may be read from physical storage 110a, 110b into system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

As noted above, inline compression (ILC) and inline data deduplication (ILD) may be performed as part of inline processing 105a, 105b. ILC and ILD are examples of data reduction techniques that provide the ability to reduce the amount of physical storage needed for storing user data on back-end PDs of the data storage system. As discussed above and elsewhere herein, ILC and ILD may be performed as part of the I/O or data path when writing data. CPU resources of the data storage system are utilized to perform such processing for compression and data deduplication when writing data on the I/O or data path (e.g., as part of inline processing). In at least one embodiment, data reduction may be enabled by default and the user may be provided the ability to decide which storage objects or storage entities (e.g., files, directories, LUNs, data sets) should be subject to compression and/or deduplication. Data reduction techniques such as ILC and ILD are intended to lower the cost per storage unit (e.g., per gigabyte (GB) of storage). However, additional computation costs are incurred at runtime when performing ILC and ILD. For example, CPU or processor time of the data storage system is consumed when performing ILC and ILD. When both ILC and ILD are enabled whereby processing for both ILC and ILD are performed for particular storage entities, a first storage reduction benefit may be obtained. Additionally, a second storage reduction benefit may be obtained when performing only ILC or only ILD. It may be that the first storage reduction benefit obtained (when both ILC and ILD are performed) may not be sufficiently larger than the second storage reduction benefit obtained (when performing only ILC or only ILD) to outweigh the additional CPU cycles/time consumed when both ILC and ILD are performed.

It may be desirable to utilize techniques described in following paragraphs to assess the data reduction efficiency and storage space savings that may be obtained when performing only ILD (without ILC), only ILC (without ILD), and both ILD and ILC. In at least one embodiment, one or more metrics or data reduction statistics may be used to perform such an assessment in an objective manner to selectively activate or enable only compression, only deduplication, both compression and deduplication, or optionally not enable any data reduction. Such selection may be performed automatically or manually (e.g., recommended option determined based on automatic assessment where with user confirmation may be performed prior to enabling or activating the recommended option).

The storage reduction obtained as a result of performing compression and deduplication may have a large intersection or overlap such that performing both compression and deduplication may not result in a larger reduction in storage than performing either individually. More generally, the storage reduction obtained when performing both compression and deduplication for a particular data set may not be sufficiently larger (e.g., by more than a specified threshold) than the storage reduction obtained when performing only ILD or only ILC. In at least one embodiment in accordance with techniques herein, a graphical representation of the storage savings obtained with compression and data deduplication may be presented to a user for one or more data sets. In at least one embodiment, a user may be presented, on a graphical user interface (GUI) display, with a Venn diagram for a data set to graphically illustrate any overlap of reduction benefit in storage obtained with both ILC and ILD. In such an embodiment, a selection may be made to automatically perform only ILD, only ILC, or both ILC and ILD, based on the comparative reduction in storage obtained in all three of the foregoing cases. For example, a selection of a particular data reduction option (e.g., enabling only ILD, only ILC or both ILC and ILD) for a data set may be automatically determined as the particular option resulting the maximum data reduction benefit. A selection may also be made by user input based on the displayed Venn diagram.

Following is an example of metrics or data reduction statistics that may be used in at least one embodiment in accordance with techniques herein. In particular, given specified compression and deduplication ratios denoting the storage savings benefit, processing may be performed to calculate the intersection of the storage reduction savings, as well as other values described herein.

Generally, a data set may be any defined set of stored data such as, for example, a database, one or more selected portions or logical address space portions of a database, data used by a particular application stored on one or more LUNs, selected portions of one or more LUNs, one or more files, one or more directories, one or more file systems, particular portions of one or more directories or file systems, and the like.

Let $R_c$ denote the compression ratio and $R_d$ denote the deduplication ratio. For a particular data set, $R_c$ may be expressed as:

$$\text{size of data set before compression/size of data set after reduction} \quad \text{EQUATION 1A}$$

For a particular data set, $R_d$ may be expressed as:

$$\text{size of data set before deduplication/size of data set after deduplication} \quad \text{EQUATION 1B}$$

To further illustrate, for a data set, the size before compression may be 100 GB and the size after compression may be 50 GB resulting in an $R_c$ of 2:1=2 or 50% compression savings (e.g., $P_c$ below) or reduction in size due to compression. Furthermore, define the following:

$$R_{cd} = R_c * R_d \text{ Combined Ratio(e.g., combined data reduction ratio)} \quad \text{EQUATION 2}$$

$$P_c = 100 - (100/R_c) \text{Compression Savings(e.g., percentage of data reduction due to compression)} \quad \text{EQUATION 3}$$

$$P_d = 100 - (100/R_d) \text{Deduplication Savings(e.g., percentage of data reduction due to deduplication)} \quad \text{EQUATION 4}$$

$P_{cd}=100-(100/R_{cd})$ Combined Savings(e.g., percentage of data reduction based on combined ratio $R_{cd}$)     EQUATION 5

$X_{cd}=P_c+P_d-P_{cd}$ Intersection of savings of deduplication and compression (e.g., percentage of data reduction shared between/in the intersection/shared of both deduplication and compression)     EQUATION 6

$X_c=P_c-X_{cd}$ Savings unique to compression(e.g., percentage of data reduction unique to compression without intersection/shared data reduction contribution with compression)     EQUATION 7A Where $X_c$ may also be expressed as:

$X_c=P_{cd}-P_d$ Savings unique to compression(e.g., percentage of data reduction unique to compression without intersection/shared data reduction contribution with compression)     EQUATION 7B $X_d=P_d-X_{cd}$ Savings unique to deduplication(e.g., percentage of data reduction unique to deduplication without intersection/shared data reduction contribution with compression)     EQUATION 8A Where $X_d$ may also be expressed as:

$X_d=P_{cd}-P_c$ Savings unique to deduplication(e.g., percentage of data reduction unique to deduplication without intersection/shared data reduction contribution with compression)     EQUATION 8B Furthermore, based on the foregoing equations, the intersection $X_{cd}$ (Intersection of storage savings or reduction of deduplication and compression as a percentage) may also be expressed in terms of compression and deduplication ratios $R_c$ and $R_d$ as follows in EQUATION 9 below:

EQUATION 9
$$\begin{aligned}X_{cd} &= P_c + P_d - P_{cd} = (100 - 100/R_c) + (100 - 100/R_d) - (100 - 100/R_{cd}) \\ &= 100 + (100/R_{cd}) - (100/R_c) - (100/R_d) \\ &= 100/R_{cd}{}^*(1 + R_c{}^*R_d - R_c - R_d) \\ &= (100^*(R_c - 1)^*(R_d - 1))/R_{cd}\end{aligned}$$

Thus $X_{cd}$ (such as expressed in connection with EQUATIONs 6 and 9) may denote the overlap or intersection of the reduction in storage when both deduplication and compression are performed together for a given data set. Put another way, $X_{cd}$ denotes the data reduction percentage for which both deduplication and compression repeat or duplicate data reduction efforts and thereby overlap (e.g., if only one of deduplication or compression is enabled, the data set would still be reduced by the percentage $X_{cd}$). The foregoing equations illustrate examples of data reduction metrics or statistics that may be calculated and used in connection with techniques herein.

For example, to further illustrate for a first data set, assume the first data set is reduced by 50% when only compression (without deduplication) is performed, and assume the data set is reduced by 50% when only deduplication (without compression) is performed. Then, based on the above data reduction statistics and equations:

$R_c=2$ $R_d=2$ $R_{cd}=2^*2=4$ $X_{cd}=100^*(2-1)^*(2-1)/4=25\%$ $X_c=50\%-25\%=25\%$ $X_d=50\%-25\%=25\%$

In connection with the foregoing, $X_c$, $X_d$ and $X_{cd}$ may be useful information in connection with making a decision of whether to perform only ILC, only ILD or both ILC and ILD. Such information may also be used in connection with presenting a Venn diagram to a user on a GUI. In the above example for the first data set, the total percent reduction in storage due to compression of 50% (e.g., when only compression is enabled) may be determined by adding $X_c$, 25%, and $X_{cd}$, 25%; the percent reduction in storage due to deduplication (e.g., when only deduplication is enabled) may be determined by adding $X_d$ and $X_{cd}$; and the total percent reduction in savings when both compression and deduplication are performed (e.g. when both compression and deduplcation are enabled and activated for the data set) is 75% which may be determined by adding $X_c$, $X_d$ and $X_{cd}$ (e.g., 25%+25%+25%). Based on the foregoing, the system may automatically determine that the maximum data reduction of 75% may be obtained when both deduplication and compression are performed, as compared to a 50% data reduction when either compression or deduplication are performed alone. The intersection or overlap in data reduction $X_{cd}$ when both compression and deduplication are enabled for the data set denotes the percentage of reduction for which no net additional data reduction is obtained when both are enabled versus enabling only one of compression or deduplication.

In at least one embodiment, processing may automatically evaluate and select a data reduction option that results in the maximum data reduction based on the foregoing calculations The possible data reduction options from which selection may be made include only performing data duplication (e.g., only ILD), only performing compression (e.g. only ILC), performing both compression and deduplication (e.g., ILC and ILD), or otherwise not performing any data reduction technique (e.g., disabling both ILD and ILC). In the above example, such processing may determine that performing both compression and deduplication results in the maximum data reduction of 75% (e.g., maximum data reduction of all available options including 50% reduction for ILD only and 50% reduction for ILC only). Such information, along with the $X_{cd}$ denoting the shared or overlap in reduction benefits, may be presented to a user in a Venn diagram as discussed below.

In at least one embodiment, processing may include automatically making such a selection and implementing (e.g., automatically) the selection to enable both compression and deduplication for the first data set in the above-noted example. As a variation, rather than automatically implement the best determined selection achieving the maximum data reduction based on calculations performed, an embodiment may provide the selection as a recommendation to the user and ask the user for confirmation to proceed with the recommended selection to enable both compression and deduplication, or otherwise select a different data reduction option for the data set (e.g., either select no reduction technique, compression-only, or deduplication-only). Additionally, a Venn diagram such as illustrated in FIG. 3 discussed below may be presented to the user to provide the user with a graphical representation of the data reduction benefits of the different options.

Figure 3:
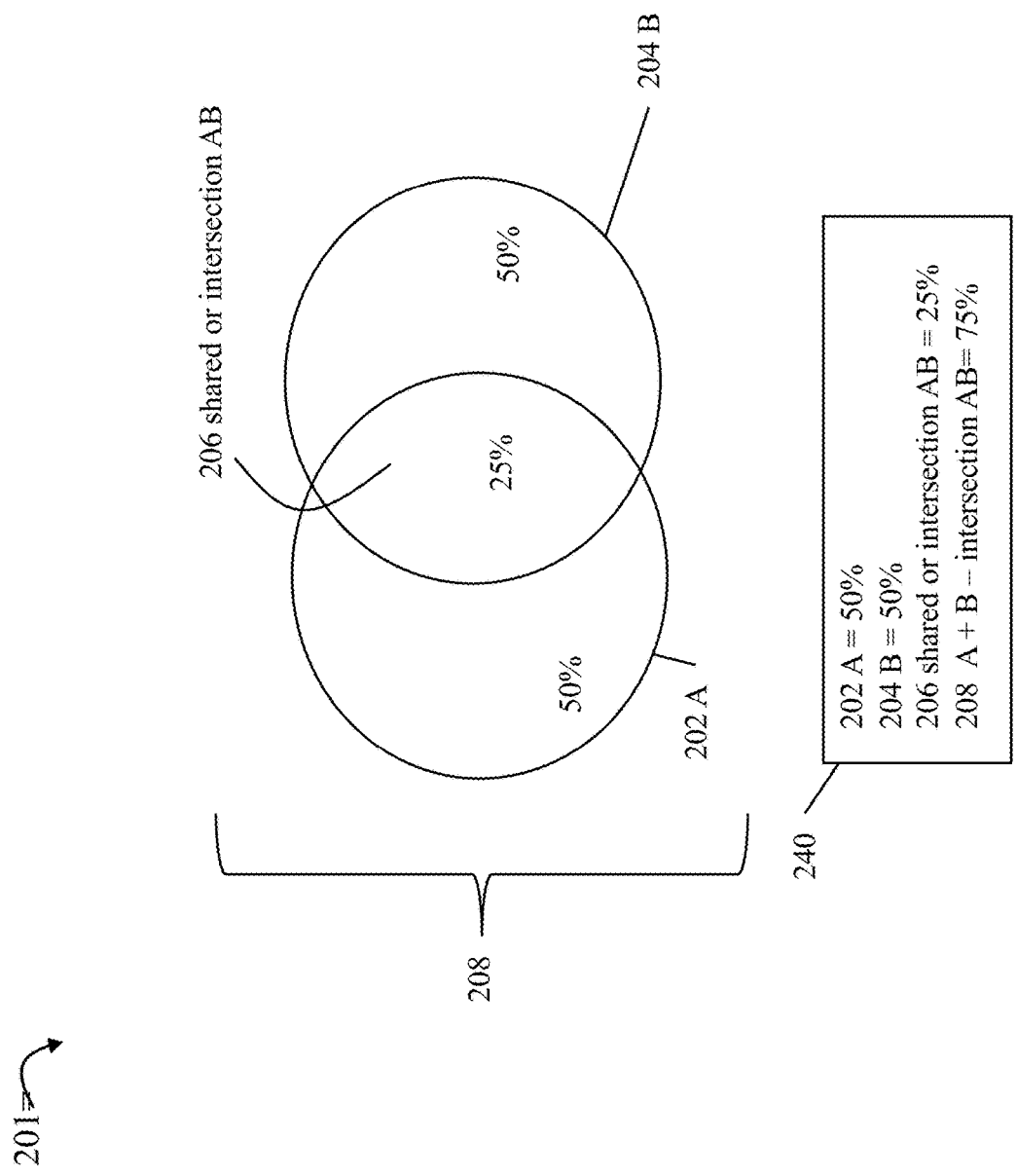
FIGS. 3, 5 and 6 are examples illustrating data reduction information that may be displayed to a user in an embodiment in accordance with techniques herein for different data sets.

Referring to FIG. 3, shown is an example 201 of information that may be presented to the user in an embodiment in accordance with techniques herein. The example 201 illustrates a representation of a Venn diagram that may be presented to the user in connection with the above-noted first data set and associated data reduction benefits obtained with deduplication and compression. Element 202 A denotes the 50% reduction obtained in connection with enabling compression only (e.g., ILC only) for the first data set. Element 204 B denotes the 50% reduction obtained in connection with enabling deduplication only (e.g., ILD only) for the first data set. Element 206 denotes the 25% overlap in reduction benefits obtained when both compression and deduplication are performed (e.g., both ILC and ILC enabled or activated at the same time) for the first data set. In this case, element 208 (denoting the collective or aggregate of 202, 204 and 206) graphically illustrates that a net aggregated 75% data reduction may be obtained when both deduplication and compression are performed for the first data set (e.g., 50% benefit in reduction A+50% reduction B−25% overlap). Element 240 summarizes the information presented graphically in the example 201. It should be noted that the information in 240 may, or may not, be explicitly or additionally presented to the user. It should be noted that elements A 202 and B 204 are circles used to graphically illustrate and denote the data reduction benefits obtained, respectively, for compression and deduplication. However, generally, in FIG. 3 and other Venn diagrams of FIGS. 5 and 6, other shapes may be used to illustrate the benefits and overlap or intersection 206 therebetween.

Referring to FIG. 4, shown is a table 300 of values for different data reduction statistics for different data sets that may be used in an embodiment in accordance with techniques herein. The table 300 includes 4 columns of information: a first column 302a identifying characteristics of the data set such as based on a data set type and application type; a second column 302b of a percentage of data reduction for ILC only (e.g., $P_c$ values); a third column 302c of a percentage of data reduction for ILD only (e.g., PD values); and a fourth column 302d of a percentage of data reduction when both ILC and ILD are enabled for the data set (e.g., $P_{cd}$ values). Each row of the table 300 specifies a set of values for $P_c$, $P_d$ and $P_{cd}$ for the particular data set characterized by 302a. In one aspect, the values in columns 302b, 302c and 302d for the different data sets identified in column 302a may be typical, average or expected data reduction benefits for the different data sets identified in 302a. Values 302b, 302c and 302d for the different data sets identified in 302a may be determined in any suitable manner such as, for example, based on expertise, knowledge and usage of the different data sets and data reduction benefits achieved based on historical usage. The table 300 may be a predetermined table of values provided, for example, by a data storage vendor or third party based on historical usage of data reduction benefits achieved using ILC and/or ILD in a data storage system.

Column 302a generally describes the data set based on data set type and/or application type. The data set type may denote the particular usage of the data set and what kind of data is stored in the data set. For example, the data set type may denote whether the data set includes files, directories, and the like, used with file services such as NFS (network file system) or IT (information technology) infrastructure (e.g., row 304, column 302a), virtual machine data such as storage volumes used with virtual servers and user application data used in virtualized environments (e.g., row 306, column 302a), data for a database (e.g., rows 308 and 310, column 302a), data for an email server or application or collaborative software (e.g., rows 312 and 314, column 302a), engineering data (e.g., generally numerical data used with different engineering applications such as VLSI for circuit design; row 316, column 302a), geoseismic data (e.g., numerical sensor data obtained in connection with seismic events such as tremors, earthquakes; row 318, column 302a), archival data (e.g., data that has been archived whereby it may be older and not frequently accessed data; row 320, column 302a), and backup data (e.g., data generated through use of back-up applications such as for backups made hourly, daily, weekly, and the like; row 322, column 302a).

Additionally, a row of the table 300 may further include in column 302a an application type, vendor and/or version, if applicable, to further characterize or identify the data set. For example, rows 308 and 310 both include data sets for a "database" data set type. Row 308 values are further identified as applying for use with a database for a particular application type and vendor, such as Oracle® OLTP (online transaction processing), and row 310 values are further identified as applying for use with a database for a particular application type and vendor, such as Oracle® DW (data warehouse) which includes snapshots of one or more databases. Rows 312 and 314 both include data sets for an email or collaborative software data set type. Row 312 values are further identified as applying for use with an email application by a particular application type, vendor and/or version, such as Microsoft® Exchange 2003/2007, and row 314 values are further identified as applying for use with another email application by a different application type, vendor and/or version, such as Microsoft® Exchange 2010.

A row of the table 300 may not include one or more typical values for a listed data set if, such values may vary, for example, due to dependencies on the particular application used as well as the particulars of the type of data in the data set used with the application. For example, rows 320 and 322 do not specify any typical or expected values for 302b and 302d since such values may vary due to dependency, respectively, on the particular archive application and backup application utilized to obtain the data sets. However, typical deduplication data reduction percentages Pd 302c may be specified for archival data and backup data (e.g., backup data typically has a high rate of data duplicates such as 95% since the data set may include multiple versions of the same files or other storage objects).

Figure 5:
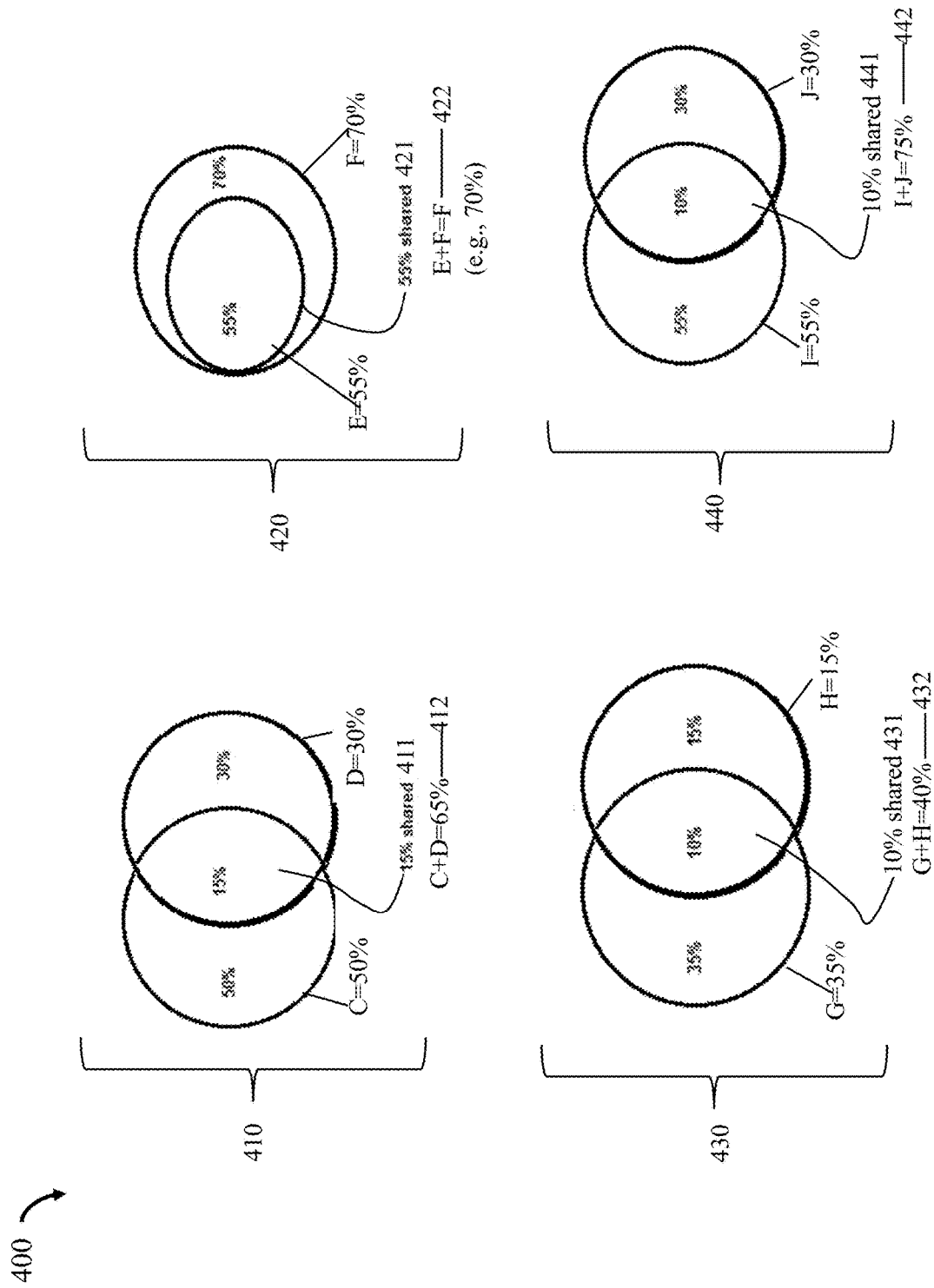
Figure 6:
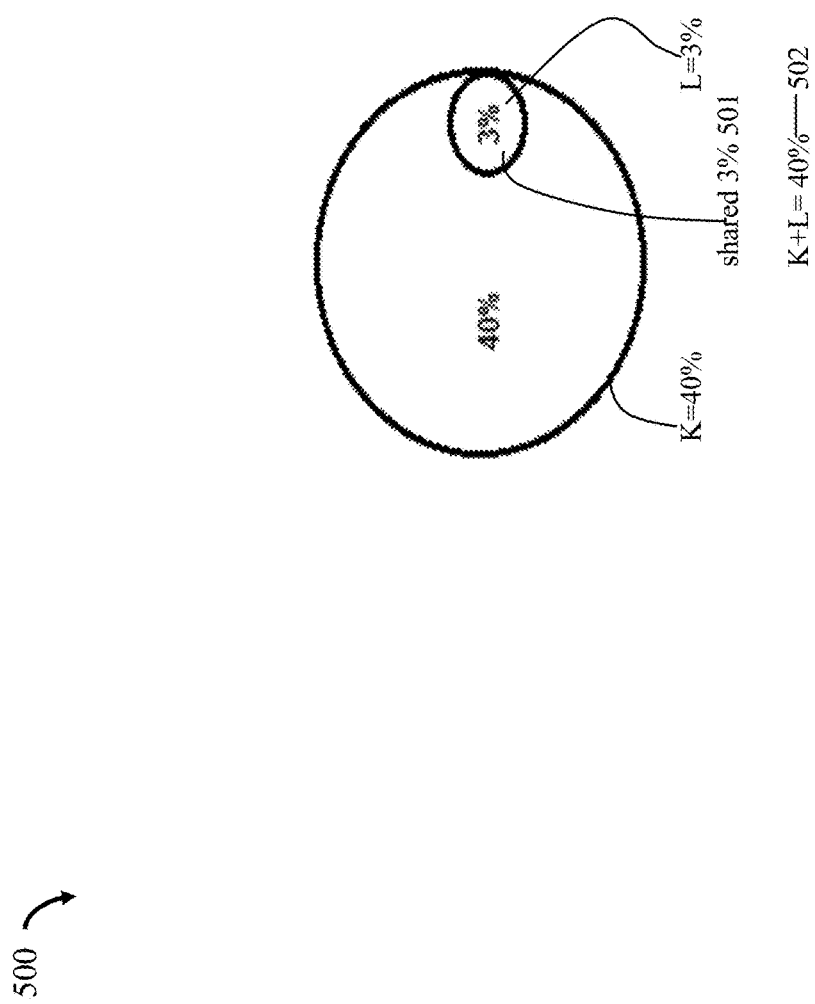

Referring to FIGS. 5 and 6, shown are further examples of information that may be presented to the user in an embodiment in accordance with techniques herein. The examples 400 of FIG. 5 and 500 of FIG. 6 illustrate a representation of a Venn diagram that may be presented to the user, such as in a GUI, in connection with different ones of the above-noted data sets of the table 300 of FIG. 4 to graphically illustrate associated data reduction benefits obtained with deduplication and compression.

Element 410 of FIG. 5 denotes information that may be presented to illustrate data reduction benefits obtained in connection with a data set characterized by row 304 of table 300, such as for file services or IT infrastructure. Element C denotes the 50% reduction obtained in connection with enabling compression only (e.g., ILC only) for the data set characterized by row 304. Element D denotes the 30% reduction obtained in connection with enabling deduplication only (e.g., ILD only) for the data set characterized by row 304. Element 411 denotes the 15% shared or overlap in reduction benefits obtained when both compression and deduplication are performed (e.g., both ILC and ILC enabled or activated at the same time) for the data set. In this case, element 410 (denoting the collective or aggregate of C, D and 411) graphically illustrates that a net aggregated 65% data reduction 412 may be obtained when both deduplication and compression are performed for the data set (e.g., 50% benefit in reduction C+30% reduction D−15% overlap).

Element 420 of FIG. 5 denotes information that may be presented to illustrate data reduction benefits obtained in connection with a data set characterized by row 306 of table 300, such as for virtual servers, virtual machines and other storage of virtualized environments. Element E denotes the 55% reduction obtained in connection with enabling compression only (e.g., ILC only) for the data set characterized by row 306. Element F denotes the 70% reduction obtained in connection with enabling deduplication only (e.g., ILD only) for the data set characterized by row 306. Element 421 denotes the 55% shared or overlap in reduction benefits obtained when both compression and deduplication are performed (e.g., both ILC and ILC enabled or activated at the same time) for the data set. In this case, element 420 (denoting the collective or aggregate of E, F and 421) graphically illustrates that a net aggregated 70% data reduction 422 may be obtained when both deduplication and compression are performed for the data set (e.g., 55% benefit in reduction E+70% reduction F−55% overlap).

Element 430 of FIG. 5 denotes information that may be presented to illustrate data reduction benefits obtained in connection with a data set characterized by row 314 of table 300, for an email application server such as Microsoft® Exchange 2010. Element G denotes the 35% reduction obtained in connection with enabling compression only (e.g., ILC only) for the data set characterized by row 314. Element H denotes the 15% reduction obtained in connection with enabling deduplication only (e.g., ILD only) for the data set characterized by row 314. Element 431 denotes the 10% shared or overlap in reduction benefits obtained when both compression and deduplication are performed (e.g., both ILC and ILC enabled or activated at the same time) for the data set. In this case, element 430 (denoting the collective or aggregate of G, H and 431) graphically illustrates that a net aggregated 40% data reduction 432 may be obtained when both deduplication and compression are performed for the data set (e.g., 35% benefit in reduction E+15% reduction F−10% overlap).

Element 440 of FIG. 5 denotes information that may be presented to illustrate data reduction benefits obtained in connection with a data set characterized by row 316 of table 300, such as for engineering data. Element I denotes the 55% reduction obtained in connection with enabling compression only (e.g., ILC only) for the data set characterized by row 316. Element J denotes the 30% reduction obtained in connection with enabling deduplication only (e.g., ILD only) for the data set characterized by row 316. Element 441 denotes the 10% shared or overlap in reduction benefits obtained when both compression and deduplication are performed (e.g., both ILC and ILC enabled or activated at the same time) for the data set. In this case, element 440 (denoting the collective or aggregate of I, J and 441) graphically illustrates that a net aggregated 75% data reduction 442 may be obtained when both deduplication and compression are performed for the data set (e.g., 55% benefit in reduction I+30% reduction J−10% overlap).

The example 500 of FIG. 6 denotes information that may be presented to illustrate data reduction benefits obtained in connection with a data set characterized by row 318 of table 300, such as for geoseismic data. Element K denotes the 40% reduction obtained in connection with enabling compression only (e.g., ILC only) for the data set characterized by row 318. Element L denotes the 3% reduction obtained in connection with enabling deduplication only (e.g., ILD only) for the data set characterized by row 318. Element 501 denotes the 3% shared or overlap in reduction benefits obtained when both compression and deduplication are performed (e.g., both ILC and ILC enabled or activated at the same time) for the data set. In this case, the example 500 of FIG. 5 (denoting the collective or aggregate of K, L and 501) graphically illustrates that a net aggregated 40% data reduction 5022 may be obtained when both deduplication and compression are performed for the data set (e.g., 40% benefit in reduction K+3% reduction L−3% overlap).

For each particular data set, or more generally, each of the different storage entities or logical groups of such entities, any suitable technique may be used to determine the compression ratio $R_c$ and the deduplication ratio $R_d$ used in the above-noted calculations and metrics in processing in connection with techniques herein to select a data reduction option for the data set. For example, a stand-alone tool (e.g., program) may be used which scans the data set, or selected one or more portions of the data set, to determine values for $R_c$, $R_d$ and other data reduction statistics described herein. The tool may be executed offline, or more generally, without comparing actual data set size reduction as a result of I/Os issued over the I/O or data path. For example, the tool may be executed as a background process when the CPU utilization is low or idle. The tool may be executed, for example, to process data sets to which no I/Os have been issued. The tool may traverse different data sets, may assess or simulate the expected data reduction benefit that would be obtained using deduplication and/or compression, and may calculate $R_c$ and $R_d$ for each such data set (e.g., without actually having performed I/Os and ILC and ILD) in the data set). The tool may traverse the entire data set, or selected portions of the data set, to determine $R_c$ and $R_d$ values for the data set. Using such $R_c$ and $R_d$ values for the data set, different data reduction statistics such as described in FIG. 3 and elsewhere herein may be further calculated and used to select the best data reduction option to enable for the data set for inline data reduction. The selected data reduction option (e.g., compression-only, deduplication-only, both deduplication and compression, or no reduction enabled) for the data set may be determined in any suitable manner, some of which are described herein. For example, the option automatically selected and enabled for the data set may result in the maximum data reduction of the original data set of all available data reduction options. As a variation, information such as described above and in the example of FIG. 3 may be presented to a user with a recommendation of which data reduction option to select (to obtain maximum data reduction), where the user may confirm the selected recommended option, or otherwise select a different option for data reduction to be enabled for the data set. Additionally, such recalculation of $R_c$ and $R_d$ and other data reduction statistics by the tool may be periodically performed at subsequent time periods to reassess the currently selected data reduction option. In this manner, the particular data reduction option recommended and enabled for a data set may change over time as the tool reperforms its processing and analysis. For example, an initial determination of $R_c$ and $R_d$ may result in recommending and enabling only compression to achieve the maximum data reduction for the data set from all available data reduction options. After a time period, the tool may again traverse the data set, or portions of it, and determine updated values for $R_c$ and $R_d$. Such updated values for $R_c$ and $R_d$ may be used to calculate revised data reduction statistics such as described herein and in connection with FIG. 3 whereby the maximum data reduction is now determined by selecting and enabling both compression and deduplication. As a result, both compression and deduplication may be enabled for the data set after the time period. In a similar manner, the tool may periodically reassess the data set at different subsequent points in time and further enable or disable ILC and/or ILD based on revised $R_c$, $R_d$ and other data reduction statistics determined at such points in time.

As another second technique, the $R_c$ and $R_d$ values for a data set may be based on the reduction in size of the data set during a time period when data reduction is enabled or "on" for the data set and when actual I/Os are issued to the data set. In this second technique, both ILC and ILD may be initially enabled for the data set for a time period. At the end of the time period, values for $R_c$ and $R_d$ and other data reduction statistics such as illustrated and described herein and in connection with FIG. 3 may be determined based on actual reduction in data set size obtained for writes to the data set during the time period (e.g., based on observed I/Os to determine when a write resulted in deduplicating or compressing data). Such values for the data reduction statistics may be used to automatically select the data reduction option that results in the maximum data reduction of the data set. Alternatively, such values may be included in information presented to the user for confirmation of a recommended best option or selection of an alternative data reduction option for the data set. At a subsequent point in time, such recalculation of $R_c$ and $R_d$ and other data reduction statistics described herein may be repeated for the data set using the tool and/or based on the resulting data set size for a particular option that has been enabled for inline I/O processing for the data set during the subsequent time period. The currently selected data reduction option may be revised based on the recalculated $R_c$, $R_d$ and other data reduction statistics (e.g., revised option selected automatically or based on user input such as described above in connection).

As yet another variation, the tool may be executed to determine initial values for $R_c$, $R_d$ and other data reduction statistics herein for a data set, and a data reduction option may be selected and initially enabled for the data set based on such data reduction statistics. Such initial values for $R_c$ and $R_d$ may be revised and updated over time as I/Os are subsequently issued to the data set. Processing may periodically recalculate $R_c$, $R_d$ and other data reduction statistics for the data set based on data set size reduction achieved as a result of actual I/Os issued over the I/O or data path when compression and/or deduplication are enabled as part of inline I/O path processing. Alternatively, the tool may be used to determine revised values for $R_c$ and/or $R_d$ and other data reduction statistics, for example, by scanning the data set if a particular data reduction technique (compression or deduplication) is currently not enabled during the time period. In this manner, $R_c$, $R_d$ and other data reduction statistics, and the determination of the data reduction technique(s) enabled/disabled (e.g., via user selection or automatic selection to achieve maximum data reduction) may be updated over time as the content or user data of the data set may change over time.

As yet another technique in connection with determining $R_c$ and $R_d$ values for a data set, there may be a predetermined table of data sets (e.g., similar to the table in FIG. 4) for which default or initial $R_c$ and $R_d$ values may be predetermined or already stored for use with techniques herein. The predetermined data sets may have particular characteristics or attributes such as based on the data set type and application type as illustrated in 302a. Initial values for $R_c$ and $R_d$ for a new data set may be determined, such as by selecting one of the predetermined data set types or rows of the table of FIG. 4 having attributes or characteristics most closely matching those of the new data set, and then using the default $R_c$, $R_d$ and other statistical values for the selected row as the initial values for the new data set. Subsequently, revised values for $R_c$, $R_d$ and other data reduction statistics for the new data set may be determined after a time period during which I/Os have been issued to the data set. At the end of the time period, revised values for $R_c$, $R_d$ and other data reduction statistics described herein may be calculated for the data set using the tool and/or based on the actual size reduction experienced by the data set during the time period (e.g., if ILD is enabled during the time period, the actual size reduction of the data set may be used to determine the revised $R_d$; if ILC is enabled during the time period, the actual size reduction of the data set may be used to determine the revised $R_c$; if both ILD and ILC are enabled during the time period, the actual size reduction of the data set may be used to determine the revised $R_c$, $R_d$ and $R_{cd}$). Based on the revised values, the currently selected data reduction option (e.g., whether each of deduplication and data reduction are enabled or disabled) may be revised (e.g., via user selection or automatic selection of option that achieves maximum data reduction).

In at least one embodiment, the user may be alerted if a change (e.g., within some specified threshold amount) is detected between first and second points in time with respect to the data reduction benefit obtained with deduplication and/or compression for a data set. In response to detecting a change in the level of data reduction obtained for the data set, processing may be performed to revise the data reduction option currently selected and enabled for the data set. Consistent with discussion elsewhere herein, the revised data reduction option may be determined, for example, automatically (e.g., select and enable the option providing the maximum data reduction with respect to all options) Alternatively, the user may be presented with a recommendation of the option that provides the maximum data reduction along with other information, such as displaying a Venn diagram with information as illustrated in FIGS. 3, 5 and 6. The user may then confirm that the recommended data reduction option should be implemented or enabled for the data set, or otherwise make a different selection for the data reduction option (e.g., such as based on the information presented in the Venn diagram denoting the current data reduction information for the data set). It should be noted that the change detected may be with respect to a change in values for one or more specified data reduction statistics (e.g., such as a detected change in one or more of $P_c$, $P_d$, $P_{cd}$, $R_c$, $R_d$, $R_{cd}$, and others described herein).

In connection with determining initial and/or revised data reduction options for a data set, the user can decide which data reduction option and techniques (e.g., ILD only, ILC only, both ILC and ILD, no data reduction) to enable for a data set based on presented information. For example, a user may be presented with information for a data set in a form such as a Venn diagram of FIGS. 3, 5 and 6, and then the user may select an option identifying which data reduction techniques are enabled/disabled for the data set.

In at least one embodiment, a user may specify a minimum data reduction target in order to enable any data reduction technique for one or more data sets. For example, a user may specify a minimum data reduction target of 30% for a data set. In this case, no data reduction option (e.g., ILD only, ILC only, ILC and ILD) may be selected (e.g., automatically) for enablement for the data set unless the selected option achieves at least a 30% data reduction for the data set.

Additionally, an embodiment may present the user with the various data reduction options that meet or achieve at least the specified minimum data reduction target and allow the user to select from the one or more presented options.

In at least one embodiment, a user may specify a minimum data reduction additional benefit to be achieved before enabling both ILD and ILC as opposed to ILC only or ILD only. For example, ILD only or ILC only may be currently enabled for a given data set. Processing may determine that performing or enabling both ILD and ILC for the data set may result in the maximum data reduction of all available options. However, the user may not want to enable both ILC and ILD for the data set (thereby incurring the additional CPU processing costs) unless there is at least the minimum data reduction additional benefit achieved over the currently enabled option of ILD only or ILC only. For example, enabling both ILD and ILC for the data set may result in the maximum data reduction that is only 1% greater than the data reduction achieved when ILC only or ILD only is enabled. In this case, the user may select to enable only ILD or only ILC and not enable both ILD and ILC for the data set. Such a minimum value may be used, for example, in automatically specifying and revising data reduction options for a data set when reassessed at various points in time.

Described herein are particular embodiments and techniques that may be used to select a data reduction option enabling and/or disabling different data reduction techniques for one or more data sets. Additionally, such techniques herein may be used in connection with other applications. For example, information obtained regarding data reduction statistics for one or more data sets may be used in connection with capacity planning and provisioning of storage for the data storage system. For example, having an idea regarding the data reduction benefits obtained for different data sets may be used in connection with better estimating an amount of actual physical storage needed to store the data sets. Furthermore, if particular data sets are stored on a particular storage tier or type of storage media (e.g., such as flash-based PDs), the data reduction statistics described herein regarding data reduction benefits may be used in determining the amount of physical storage of the particular tier or storage media type needed for storing the particular data sets.

In at least some cases, a user may not have any knowledge regarding the amount of data reduction that can be achieved using compression (e.g., ILC) and/or data deduplication (e.g., ILD) for a data set. In such a case, initial values for $R_c$, $R_d$ and other data reduction statistics as described herein may be determined for the data set based on typical or default values. Additionally, an initial selection of a data reduction option may be specified for the data set (e.g., where the option identifies what data reduction techniques are enabled and/or disabled for the data set). Reassessment may be performed at one or more later points in time as described herein to learn or measure actual data reduction benefits obtained for the data set and accordingly revise, as needed, the particular data reduction option specified for the data set.

In at least one embodiment, a user may specify an option denoting what data reduction techniques are enabled/disabled for a data set or group of data sets. As new data sets are added which have similar data characteristics of other existing data sets, the currently selected data reduction option for such other existing data sets may be specified as the default or initial option for the new data sets.

Figure 7:
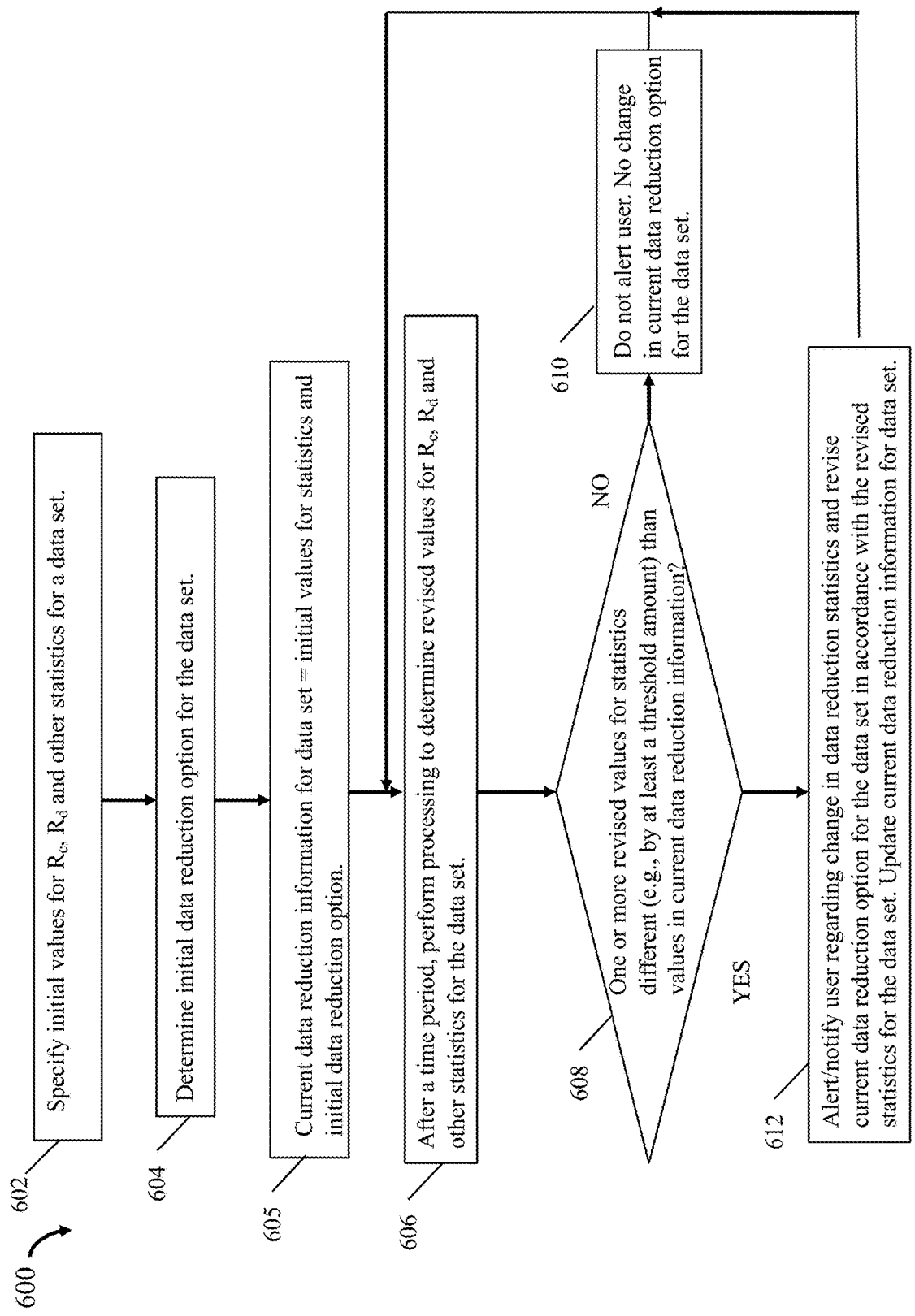

Referring to FIG. 7, shown is a flowchart 600 of processing steps that may be performed in an embodiment in accordance with techniques herein. The steps of 600 may be performed with respect to a single data set and generally summarize processing described above. At step 602, initial values for $R_c$, $R_d$ and other data reduction statistics may be determined for the data set. Such initial values may be specified using any suitable technique some of which are described herein. From step 602, control proceeds to step 604 to determine an initial data reduction option (e.g., enable ILD only, enable ILC only, enable ILC and ILD, disable both ILD and ILC) for the data set. As described herein, step 604 may generally be performed automatically without user interaction, or with user interaction. In connection with step 604, a graphical illustration of the initial data reduction statistics (determined in step 602) for the data set may be presented to the user, such as one of the Venn diagrams as illustrated in FIGS. 3, 5 and 6. From step 604, control proceeds to step 605. At step 605, current data reduction information for the data may be updated to reflect the initial values for the statistics determined in step 602 and the initial data reduction option determined in step 604 for the data set. Generally, the current data reduction information may reflect the currently selected and enabled data reduction option for the data set and values for the data reduction statistics associated with the currently selected data reduction option. Put another way, the values for the statistics used in determining or selecting the current data reduction option are stored in the current data reduction information for the data set. From step 605, control proceeds to step 606.

At step 606, after a time period during which I/Os may be issued to the data set, processing may be performed to determine revised values for $R_c$, $R_d$ and other data reduction statistics described herein for the data set. Such revised values in step 606 may be determined using any suitable technique some of which are described herein (e.g., based on actual data reduction in the data set and/or using a tool). From step 606, control proceeds to step 608 where a determination is made as to whether one or more revised statistic values differ (e.g., by at least a specified threshold difference) from one or more corresponding values as stored in the current data reduction information for the data set. For example, step 608 may include determining whether current values for $P_c$ and $P_d$ for the data set differ from initial values for $P_c$ and $P_d$ (as specified previously in step 602 and stored in the current data reduction information for the data set in step 605). If step 608 evaluates to no, control proceeds to step 610. In step 610, the user may not be alerted since no change (e.g., by at least the specified threshold difference) has been detected in values for one or more of the data reduction statistics for the data set. If step 608 evaluates to yes, control proceeds to step 612. In step 612, processing may be performed to alert or notify the user regarding the detected change in one or more data reduction statistics. Step 612 processing may also include revising the current data reduction option enabled for the data set in accordance with the detected change(s) and, more generally, in accordance with the revised statistics for the data set (as determined in step 606). Step 612 may also include updating the current data reduction information for the data set to include the revised values for the data reduction statistics (determined in step 606) and also to include the revised data reduction option. It should be noted that selecting the revised data reduction option for the data set in step 612 may be performed automatically without user interaction, or alternatively with user interaction where the data reduction statistics may be presented to the user, for example, in the form of a Venn diagram such as illustrated in connection with FIGS. 3, 5 and 6.

Consistent with discussion herein, reassessment of the data reduction statistics and current data reduction option specified for a data set as described generally in steps 606, 608, 610 and 612 may be repeated in a similar manner at subsequent points in time (e.g., to determine whether there has been a change by at least a threshold amount, compare current values for the data reduction statistics to prior values for the data reduction statistics associated with the currently selected data reduction option). As such, processing from steps 610 and 612 returns to step 606 commence performing the reassessment after another time period has elapsed. To further illustrate, current data reduction information associated with a data set may denote the currently selected data reduction option (e.g., whether ILD is enabled or disabled, and whether ILC is enabled or disabled) and values for the data reduction statistics calculated and used in determining the currently selected data reduction option. After a first time period, first revised values for the data reduction statistics may be determined and compared to those stored in the current data reduction information. Step 608 may determine that there has been no change or difference in the compared values for the first time period. Subsequently, after a second time period, second revised values for the data reduction statistics may be determined and compared to those stored in the current data reduction information. For the second time period, step 608 may determine that there has a change or difference in at least one of the compared values for the second time period (e.g., a first value for $P_c$ for the second time period has increased in comparison to a prior value for $P_c$ as included in the current data reduction information for the data set). As a result of the detected change for the second time period, ILC only may be enabled for the data set rather than the currently selected option of ILD only and the current data reduction information may be updated to include revised values for the data reduction statistics as determined for the second time period.

As a variation from processing described in FIG. 7, step 602 may be omitted and step 604 may include selecting the initial data reduction option for the data set to enable both ILD and ILC and then, in step 606, assessing the data reduction benefits obtained for ILD and ILC based on the actual data reduction of the data set after issuing I/Os to the data for the time period (e.g., collect statistics regarding the observed effect of data reduction techniques ILD and ILC for write I/Os issued to the data set during the time period).

Described above are techniques that may be used to assess and display, such as in a Venn diagram, data reduction characteristics or information regarding a data set at a point in time and then determining suitable options or settings, such as whether to enable or disable each of deduplication and compression for the data set. Selecting such suitable options may be made based on information acquired for a data set used by an application at a first point in time. However, over time, application usage of the data set may change for one or more reasons. For example, the data written to different portions of the data set may change over time, the typical I/O profile or pattern of application I/Os may change (e.g., size of write I/Os may change, the pattern of write I/Os may change, the particular sequential order in which logical offsets or locations are written to, may change), and the like.

Currently, data storage systems may increasingly use new and different types of faster physical storage media for non-volatile storage. For example, data storage systems may incorporate the use of more expensive flash storage devices. In some data storage systems, none of the non-volatile back end storage may include rotating disk drives and may, for example, rather use only SSD storage such as all flash storage devices. Due to the characteristics of flash storage (e.g., more costly, better performance) and the types of I/Os better suited for use with flash storage, as opposed to other types of physical storage media such as rotating disk drives, typical I/O profiles of applications may change as compared to prior I/O profiles describing I/O characteristics of the application I/Os when the application data is stored on less costly older rotating disk drives. As a result, historical data characterizing data reduction characteristics, (e.g., such as compressibility of application data, deduplicability of application data) application I/O patterns, and the like, may no longer be relevant since the actual I/O profile of the application as well as characteristics of the application data may now have changed. Thus, general well-known characteristics and behaviors about an application and its data, such as a typical I/O profile or reducibility regarding application data on non-flash storage (e.g., rotating disk drives), may no longer be relevant due to changes in typical application I/Os and associated application data now stored on flash media.

Additionally, with the increased use of more expensive, costly non-volatile storage media such as flash storage, there is increased importance in data reduction techniques to reduce the size of data and thus reduce the amount of the more expensive storage required to store application data. However, as described elsewhere herein, there is a tradeoff between costs, such as increased CPU execution time, associated with data reduction techniques and the benefits of a reduced size data set. For example, there is an undesirable waste of CPU execution time to perform data reduction on a data set that may be characterized as uncompressible, or rather does not achieve at least a minimum specified amount of rate of data reduction.

Techniques described above, such as using the Venn diagram as described herein, may take into account the overlap in storage savings or reduction obtained with compression and deduplication and may be used to determine whether to use/enable just one of the data reduction techniques or both for a data set.

However, since the reducibility of application data, application I/O patterns and other characteristics may change (e.g., been adapted or modified for use with flash storage), the historical information regarding well-known I/O patterns, reducibility of application data, and the like, may be stale and no longer be applicable for use in selecting options to enable/disable any of compression and deduplication. Accordingly, obtaining such updated characteristics and reducibility information about the application and its data in a dynamic manner may be performed to better assess and select such options.

Described herein in following paragraphs are additional techniques that may be used to analyze data sets in order to have a better understanding regarding the different data reduction characteristics of a data set. In at least one embodiment, one or more statistics may be obtained for a data set in order to understand the data reduction characteristics of different regions (e.g., logical offset or locations in the data set) of the data set. For example, such techniques may be used to identify different regions of a data set and the different compression characteristics and/or deduplication characteristics that may vary with such regions of the same data set. Such techniques may include running an analysis tool on data set to obtain revised, updated information regarding characteristics of the data sets that may have changed. Additionally, such information may be obtained on a continual basis in order to automatically and dynamically adapt data reduction settings, options and techniques performed as characteristics of application data, such as reducibility of different data sets or portions of a data set, may change over time. Consistent with other discussion herein, such a tool may be used on a statically stored data set and executed offline (e.g., not as part of inline processing) as well as while I/Os are being issued to the data set (e.g., inline analysis). In at least one embodiment, the tool may perform data compression and/or data deduplication of data sets in order to provide information regarding the reducibility of different portions of the data sets. In at least one embodiment having multiple storage tiers including flash storage (e.g., in a first storage tier) and rotating disk drives (e.g., in one or more other storage tiers), information and characteristics regarding the reducibility of a data set may be used to decide the particular storage tier in which to store the data set, or portions thereof. Such information and characteristics regarding the reducibility of a data set, and portions thereof, may also be used in capacity planning, such as how much storage capacity of flash storage and other tiers to purchase based on the expected data reduction and any planned growth/need for additional storage capacity of such data sets.

Consistent with discussion herein, such techniques described in following paragraphs may be used in a manner similar to other techniques described above to tune and select data reduction options enabled for use with the data set as reducibility of different portions of the data set may change over time. Such techniques may be used, for example, to automatically (e.g., without further user interaction) make changes in data reduction options enabled or disabled, to make recommendations to a user who may then confirm or otherwise select options different from as recommended, to present visually such as on a user interface different Venn diagrams of the data reduction characteristics at different points in time (e.g., thereby providing a visual display of the dynamically changing data reduction characteristics of a data set), and the like.

Figure 8A:
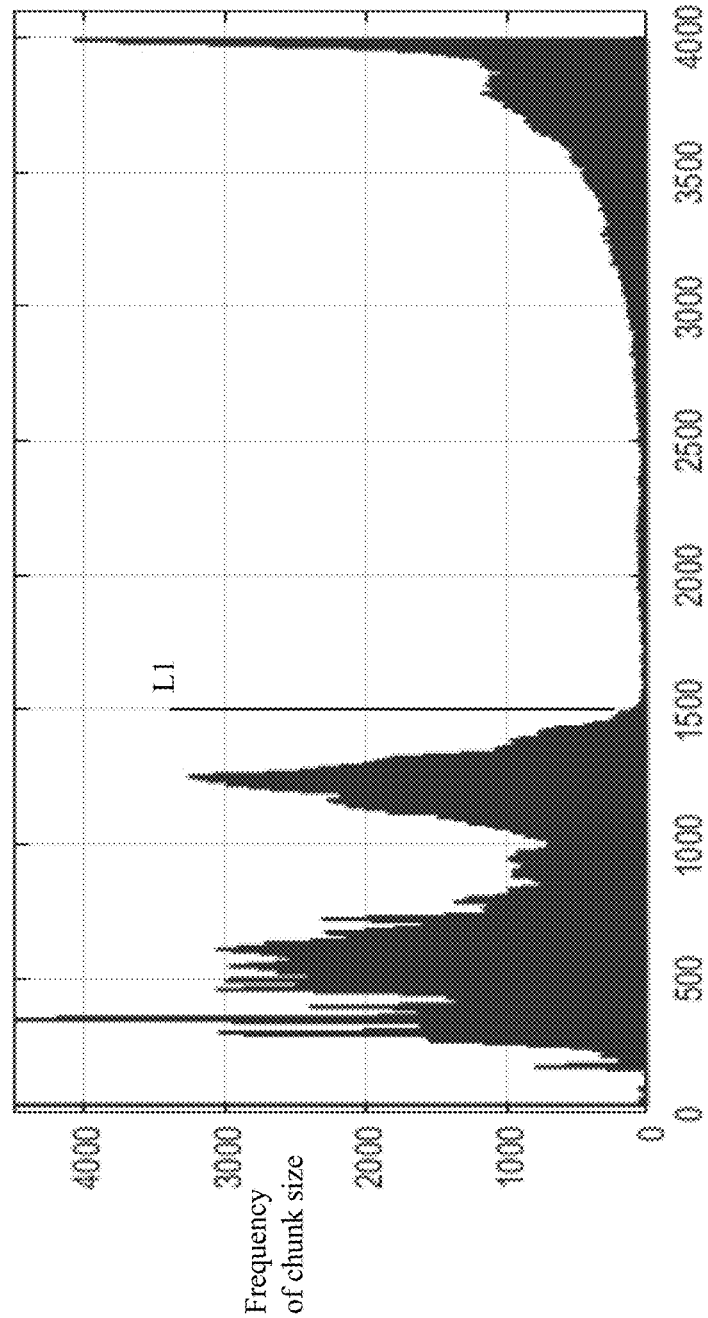
FIGS. 8A, 8B, 8C, 9 and 10 are graphical illustrations of analysis that may be performed using data reduction information in an embodiment in accordance with techniques herein.

Referring to FIG. 8A, shown is a graph 700 of a histogram of compressed chunk sizes for a data set in one embodiment in accordance with techniques herein. The graph 700 includes compressed chunk sizes in number of bytes on the X axis, and a frequency or count of a chunk size on the Y axis. The graph 700 displays the analysis results of a data set that is compressed in 4 KB (e.g., 4096 byte) chunks so that, for each 4 KB chunk, compression processing may output a compressed form of the chunk having size that is 4 KB or less. It is the resulting sizes (e.g., in bytes) of the compressed chunks which are counted and displayed in the histogram of FIG. 8A for the data set. The graph 700 indicates that the majority of chunks of the data set are reduced by more than ½ the original size. In particular, vertical line L1 denotes an X axis value of about 1500 bytes or about 1.5 KB. The cumulative frequency of all compressed chunks having a size less than 1500 bytes is denoted by the sum of the frequencies appearing to the left of L1. Such a cumulative frequency graphically illustrated by the sum of frequencies to the left of L1 account for more than half of all chunks of the data set. Based on at least a specified minimum number of chunks (e.g., more than 50%) having at least a specified compressed size (e.g., 1.5 KB or 1500 bytes) or compression ratio (e.g., uncompressed size of 4 KB/compressed size of 1.5 KB), processing may determine that compression should be enabled for the entire data set.

Thus, in at least one embodiment in accordance with techniques herein, the data set may be compressed at a first point in time and the compression results (e.g., compressed sizes of chunks) further analyzed in accordance with the histogram as in FIG. 8A in order to make a determination of whether the enable or disable compression processing (e.g., such as part of ILC or when offline not as part of ILC) for subsequently written data to the data set. In accordance with such an embodiment, a first parameter may specify a minimum number of chunks and a second parameter may specify a minimum compression ratio or storage reduction benefit whereby compression for a data set may be enabled if such threshold conditions or criteria are met. For example, the first parameter may indicate the minimum number of chunks as a threshold percentage (e.g., such as 50%), an absolute value denoting a integer number of chunks, and more generally in any other suitable manner. The second parameter may indicate the minimum storage reduction benefit as a compression ratio (e.g., such as 4/1.5), an absolute value (e.g., 1.5 KB or 1500 bytes), and more generally in any other suitable manner.

Figure 8B:
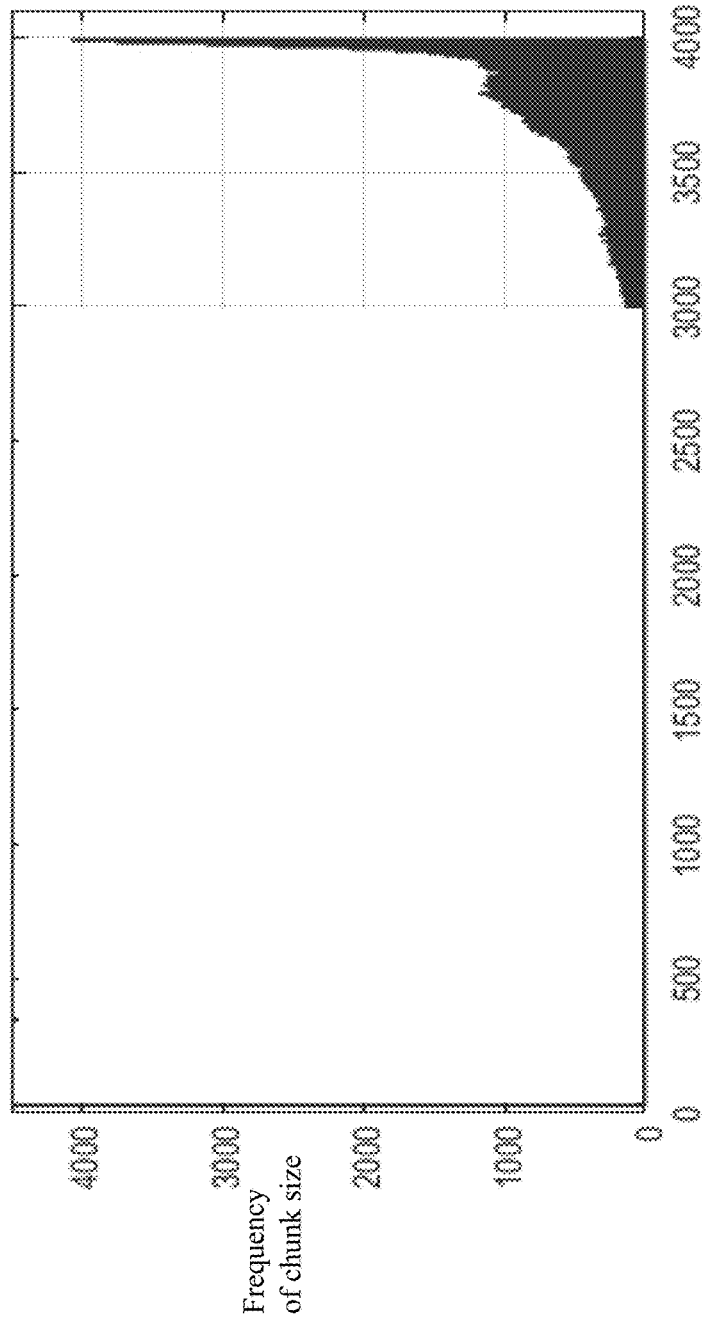

As a result of processing performed at the first point in time in the example of FIG. 8A, compression may be enabled of the data set for a subsequent first time period. Subsequently, during the first time period, data may be written to the data set. A second set of compression information regarding the resulting compressed sizes of such data written during the first time period may be obtained. The second set of compression information may be used to perform a reassessment of the compression characteristics of the data set based on the data written during the first time period whereby another second histogram may be produced. Assume the second histogram obtained at the second point in time at the end of the first time period is similar to that of FIG. 8A whereby processing once again determines that compression for the data set is enabled. For example, assume that each time period is a day where the second histogram of compression information is obtained at the end of the first day to determine whether to enable or disable compression for writes to the data set during a second day. In this example, the second histogram of information which is similar to that of FIG. 8A indicates that compression is enabled for the data set for the second day. During this second day, data chunks written to the data set are compressed. At the end of the second day at a third point in time, a third histogram of compression is obtained for writes to the data set during the second day. The third histogram may indicate a change in compression information and may be as illustrated in FIG. 8B. The example 730 of FIG. 8B illustrates the third histogram having X and Y axes as described in connection with FIG. 8A but for the third point in time at the end of the second day/time period. At this third point in time, the example 730 indicates that the data chunks written did not result in a compressed size smaller than about 3 KB or 3000 bytes. Assume, for example, that the threshold criteria was as specified in connection with FIG. 8A above, whereby processing determines based on FIG. 8B that there is insufficient compression benefit obtained as a result of having compression enabled for the data set. As a result, at the third point in time/end of the second time period, processing may determine to now disable compression processing for the data set for a subsequent third day/time period. During the third time period, compression processing may be disabled or not performed inline as part of ILC processing for writes to the data set during the third time period. At the end of the third time period, processing may be performed offline to further assess compressibility of the data chunks written to the data set during the third time period. For example, at the end of the third day, such as during non-peak, low or idle use periods of CPU utilization (e.g., during overnight non-work hours), a reassessment of the compression characteristics of the data set may be performed again/fourth time to determine a fourth set of compression information regarding the resulting compressed sizes of such data written during the third time period. The fourth set of compression information may be used to perform a reassessment of the compression characteristics of the data set based on the data written during the third time period whereby a fourth histogram similar to that as illustrated in FIG. 8A may be produced. Thus, at the end of the third day, assume for purposes of illustration that the fourth histogram is as illustrated and described in connection with FIG. 8A. The reassessment using the fourth histogram determines to once again enable compression processing for subsequent writes to the data set since the threshold conditions or criteria as described above are now met.

In this manner, processing may be periodically performed, such as at fixed time periods, to reassess the compression characteristics of a data set in an ongoing manner and obtain historical information regarding compression characteristics of the data set. Thus, such reassessment at a point in time may be performed to adjust or determine whether to enable or disable compression for data written to the data set subsequent to the point in time (e.g., such as for a next time period). For example, the compression information of FIG. 8A may be performed based on data collected on one day and used to determine revised compression settings in effect for the data set for the next subsequent day. Additionally, such reassessments may be performed to also detect historical patterns of compression information at different time periods and associated compression settings or such time periods. For example, the compression information of FIG. 8A may be performed based on data collected on a particular day of a weekly pattern, such as Monday, and used to determine compression settings in effect for that particular day after such a weekly pattern has been detected based on data collected for Monday and other days of the week. For example, over time, such as over the course of a week, it may be determined that histograms of compression information such as described in connection with FIG. 8A is typical of the compression results achieved on Monday, Tuesday, and Thursday and that compression information such as described in connection with FIG. 8B is typical of the compression results achieved on all other remaining days of the week. In this manner, compression may be enabled on Monday, Tuesday, and Thursday of each week and disabled all other days of the week for data written to the particular data set. The data set may be further assessed in an ongoing manner and enablement or disablement of compression for data written to the data set may also be accordingly modified, as needed, should the compression information characteristics of particular days of the week change. Such reassessment at the end of a time period may be based on writes written to the data set during the time period.

It should be noted that particular time periods, such as daily as described above, may be mentioned in connection with examples herein for purposes of illustration. More generally, an embodiment may use any suitable fixed or variable time period in connection with triggering reassessment of data reduction options, such as for compression and data deduplication. For example, suitable time periods may include any one or more of: hourly, each occurrence of a specified number of hours, daily, weekly, each occurrence of a specified number of days, monthly, and the like. Additionally triggering of reassessment may also be performed in accordance with the occurrence of other conditions, such as, for example, after writing more than a specified amount of data to the data set.

Figure 8C:
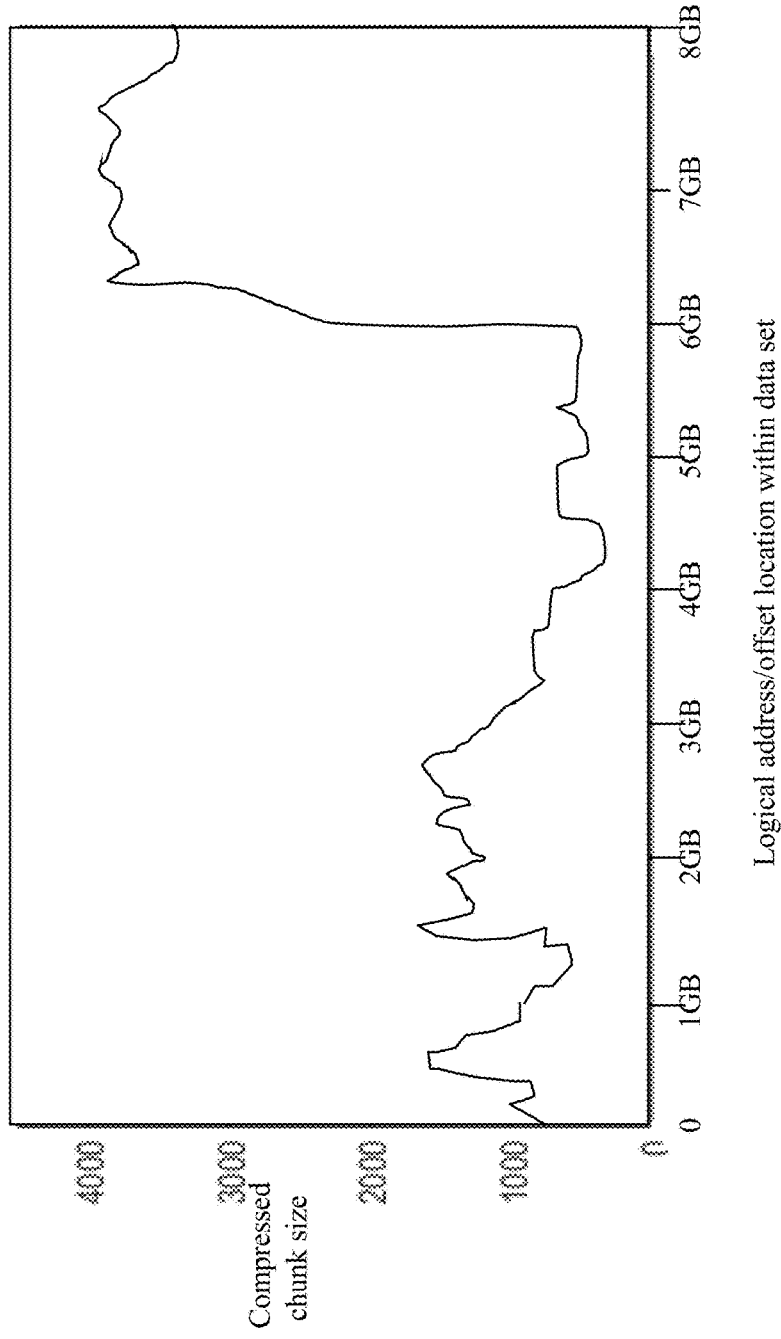

Referring to FIG. 8C, shown is a graph 750 illustrating the different compressed chunk sizes at different locations or regions of a data set in one embodiment in accordance with techniques herein. The graph 750 includes compressed chunk sizes in number of bytes on the Y axis, and a logical address or offset location within the 8 GB data set on the X axis. The graph 750 displays the analysis results of a data set that is compressed in 4 KB (e.g., 4096 byte) chunks so that, for each 4 KB chunk, compression processing may output a compressed form of the chunk having size that is 4 KB or less (e.g., Y axis values). The graph 750 indicates that a the majority of chunks of the data set are reduced by more than ½ the original size, such as illustrated by FIG. 8A. However, the graph 750 of FIG. 8C further identifies the particular region(s), logical locations or offsets in the 8B data set having particular resulting compressed sizes. As illustrated by FIG. 8C, most of the data reduction benefit obtained by compression is achieved for data chunks located in the first 6 GB of the data set. Chunks located in the 6 GB-8 GB offset location of the data set achieve almost no space savings benefit as a result of compression. An embodiment may use the information in FIG. 8C to further identify regions or portions of the data set for which compression may be enabled or disabled based on specified criteria. For example, an embodiment may specify a minimum space savings benefit (e.g., minimum compression ratio, absolute minimum compressed size such as 1.5 KB or 3.5 KB, and the like), that needs to be achieved in order for compression processing to be enabled for a particular location, region or offset within the data set, such as when writing data to such particular location, region or offset of the data set. In this manner, FIG. 8C information may be used to more selectively (e.g., at a finer granularity) enable or disable compression processing for particular portions of a data set. For example, based on FIG. 8C, an embodiment may choose to disable compression processing for subsequent writes (e.g., as part of ILC) to the 6 GB-8 GB region or portion of the data set, and to enable compression processing for writes to the remaining region or portion of the data set (e.g., at offsets less than 6 GB). Compression information of FIG. 8C may be obtained at various successive time periods such as described above in connection with FIGS. 8A and 8B in order to continuously assess and dynamically determine and adapt suitable compression settings (e.g., enable or disable) for portions of a data set at different points in time. Such reassessment at the end of a time period may be based on writes written to the data set during the time period.

Generally, compression information such as described above in connection with FIGS. 8A, 8B and 8C may be obtained as a result of performing compression at any suitable time such as, for example, as part of ILC processing, and/or offline/not part of ILC processing such as after the writes have been serviced (e.g., obtain compression information and run analysis after storing write data to data set where the compression information in any of FIGS. 8A-C may be obtained by traversing the data set when stored statically offline/not being accessed for write I/Os such as during non-peak or idle CPU utilization times). In a similar manner, data deduplication such as described below in connection with FIGS. 9 and 10 may be obtained as a result of performing data deduplication at any suitable time such as, for example, as part of ILD processing, and/or offline/not part of ILD processing such as after the writes have been serviced (e.g., obtain deduplication information and run analysis after storing write data to data set where the deduplication information in any of FIGS. 9-10 may be obtained by traversing the data set when stored statically offline/not being accessed for write I/Os such as during non-peak or idle CPU utilization times).

Figure 9:
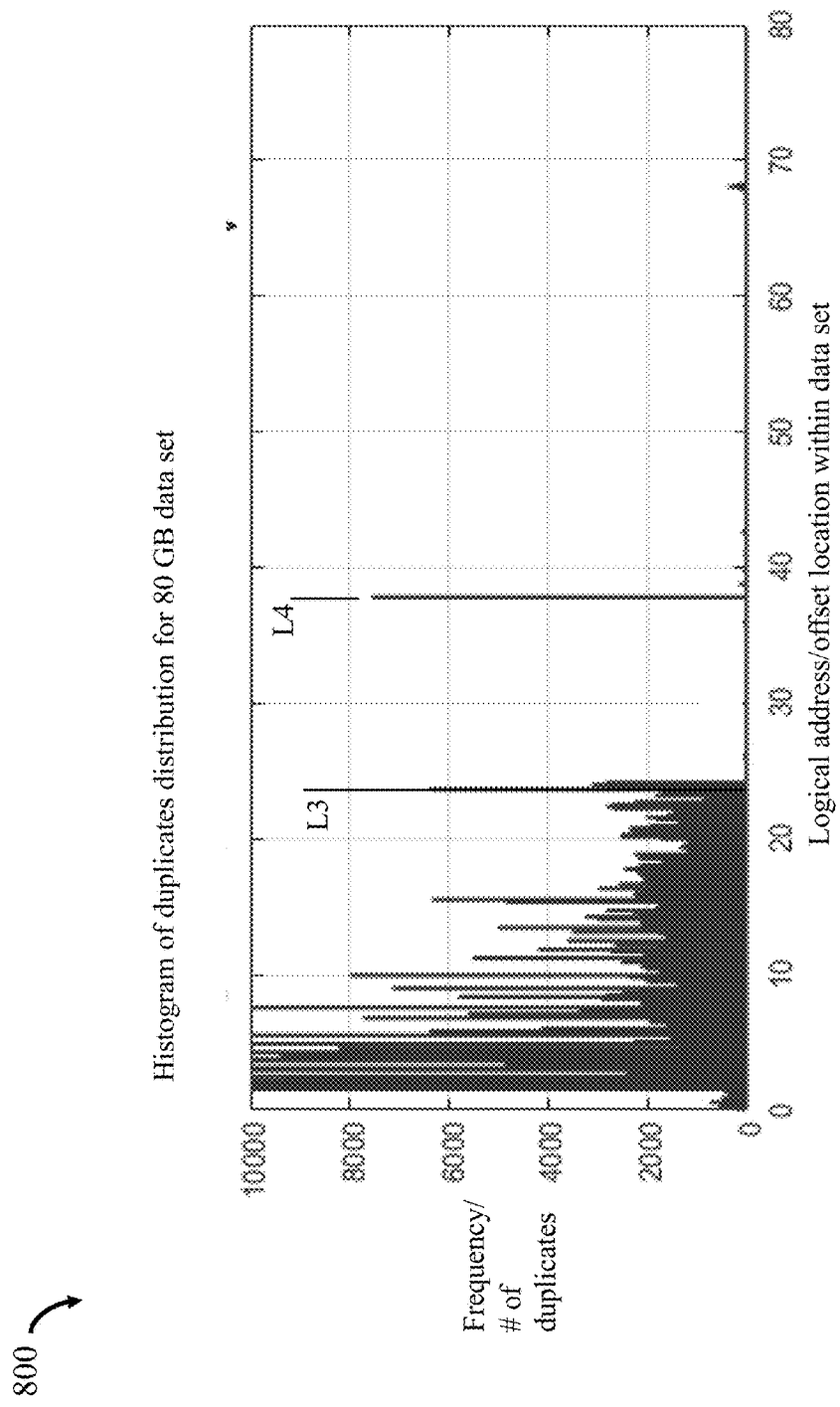

Referring to FIG. 9, shown is an example of a histogram of data deduplication information of an 80 GB data set that may be used in an embodiment in accordance with techniques herein. The example 800 includes a logical address or offset location within the 80 GB data set on the X axis and the frequency or count of the number of duplicates (identified by data deduplication) on the Y axis. The histogram 800 shows the distribution of deduplicable chunks within a data set that is 80 GB in this example. The histogram 800 indicates that data deduplication for the data set may be enabled for the application when writing the first 23 GBs (e.g., up to logical address or offset location within the data set denoted by L3) of the data set and then subsequently disabled when the application writes the remaining data to the data set. The foregoing deduplication information of FIG. 9 may be useful, for example, for determining when to enable and disable deduplication when an application writes sequentially to the data set (e.g., ILD processing of such writes), or when performing data deduplication for the data set when statically stored offline after the application has written the data (e.g., not performed as part of ILD but rather as part of background task during non-peak or idle CPU utilization times).

One important point to note in connection with FIG. 9 is the relative distance between the two logical address or offset locations L3 and L4 in comparison to a maximum threshold amount of the cache available for storing the deduplication hash table. L3 and L4 may each denote a location or logical address in the data set where at least a minimum frequency (e.g., specified number of one or more) of duplicate chunks are determined. The foregoing relative distance between L3 and L4 may denote the points at which at least a specified number of deduplicated chunks are located in the data set. Thus, not many chunks, if any, between L3 and L4 are duplicates of existing chunks and therefore chunks between L3 and L4 are mostly stored as new data chunks in cache when the data set is written to sequentially. If the relative distance between consecutive deduplication frequency peaks L3 and L4 is less than the maximum threshold amount of cache, then there may be benefit in having deduplication enabled between L3 and L4 since such existing chunks (e.g., stored in the cache prior to L3) are not all removed from the cache. Thus, in at least one embodiment in accordance with techniques herein, if the relative distance between consecutive deduplication frequency peaks L3 and L4 is not less than the maximum threshold amount of cache, then deduplication may be disabled between L3 and L4, and more generally after L3 in this example). Otherwise, if the relative distance between consecutive deduplication frequency peaks L3 and L4 is less than the maximum threshold amount of cache, then deduplication may be enabled between L3 and L4, and more generally after L3 in this example).

For a data chunk to be deduplicated, it must be a duplicate of an existing chunk already stored in the hash table. In at least one embodiment, existing chunks stored in entries of the hash table are stored in a cache. Thus, a maximum number of hash table entries and associated existing data chunks may be stored in cache at a same point in time where the maximum number is dependent on the amount of cache used for storing the hash table. When no duplicates are detected for chunks, such chunks are stored as new chunks in the hash table in cache and may result in evicting other chunks and associated entries from cache. For example assume a cache size of 10 GB. In this case, the cache can hold at most 10 GB of data chunks and hash table entries. With a 10 GB cache for deduplication chunks and hash table entries, if there are no duplicate chunks encountered when traversing sequentially through the data set from offset 23 GB to offset 33 GB, the cache is then filled up with new hash table entries and new data chunks encountered at offset locations 23 GB to 33 GB of the data set. In this example, the relative distance between L3 and L4 is more than 10 GB. As a result, there is no benefit gained by performing data deduplication after about offset or location 23 GB since chunks after this point are new chunks and not duplicates of existing chunks prior to 23 GB.

In a manner similar to that as discussed above, such as in connection with FIGS. 8A-C, processing may be performed periodically to reassess and adapt data deduplication settings. For example, data deduplication information of FIG. 9 may be obtained at various successive time periods such as described above in connection with FIGS. 8A-C in order to continuously assess and dynamically determine and adapt suitable data deduplication settings (e.g., enable or disable) for portions of a data set at different points in time. Such reassessment at the end of a time period may be based on writes written to the data set during the time period.

Figure 10:
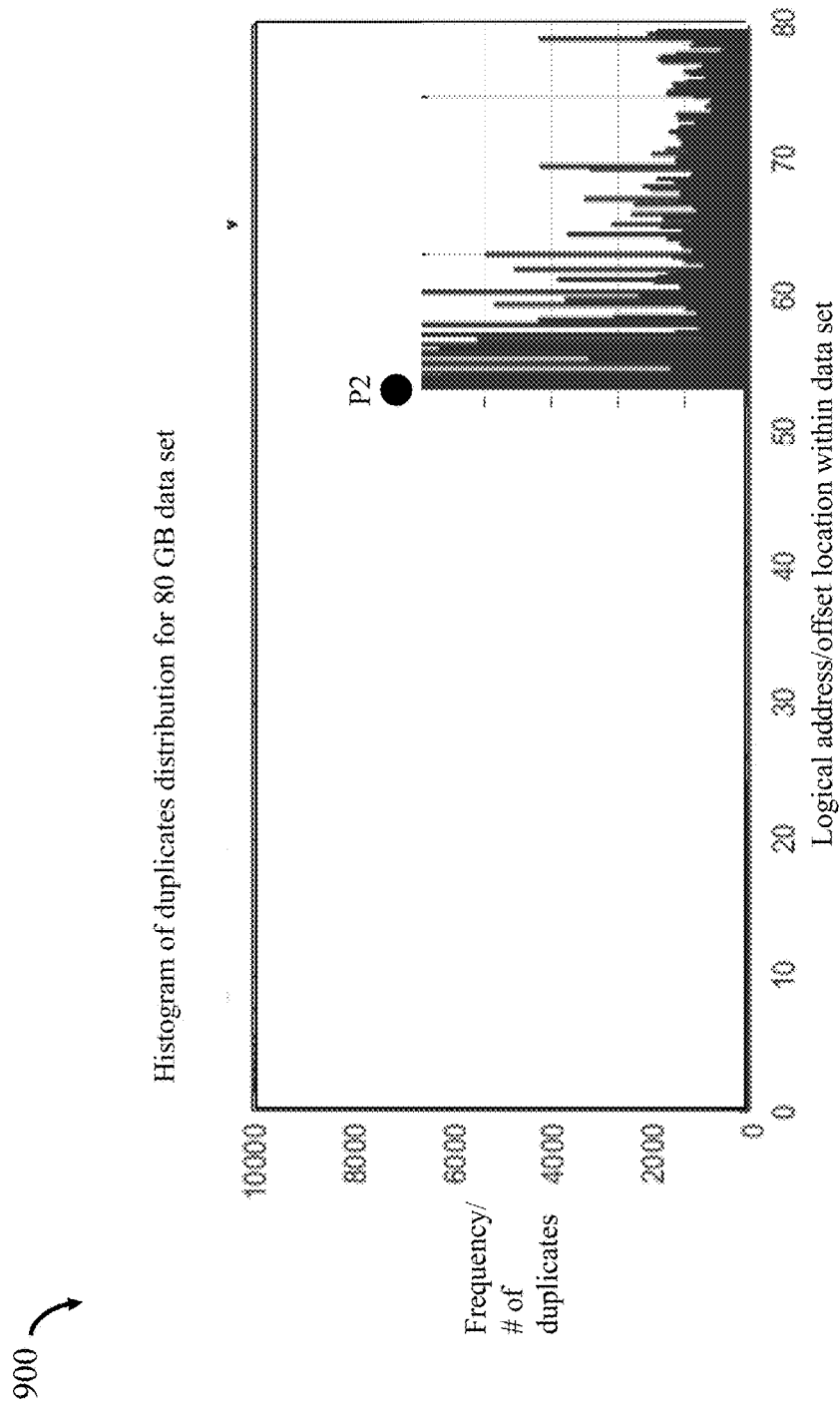

Referring to FIG. 10, shown is an example of another histogram of data deduplication information of an 80 GB data set that may be used in an embodiment in accordance with techniques herein. The example 900 includes a logical address or offset location within the 80 GB data set on the X axis and the frequency or count of the number of duplicates (identified by data deduplication) on the Y axis. The histogram 900 shows the distribution of deduplicable chunks within a data set that is 80 GB in this example. The histogram 900 indicates that data deduplication for the data set may be disabled when writing sequentially to logical addresses or locations up to P2 or 55 GB and then enabled for the application when writing chunks to logical address or offset locations 55 GB (P2) through 80 GB (e.g., logical address or offset location within the data set subsequent to P2) of the data set. The foregoing deduplication information of FIG. 9 may be useful, for example, for determining when to enable and disable deduplication when an application writes sequentially to the data set (e.g., ILD processing of such writes), or when performing data deduplication for the data set when statically stored offline after the application has written the data (e.g., not performed as part of ILD but rather as part of background task during non-peak or idle CPU utilization times).

As a variation, when processing chunks of the data set sequentially, an embodiment may enable deduplication processing at a point in time prior to P2 or 55 GB in order to assist with loading the cache with chunks that may be subsequently detected as duplicates beginning at location 55 GB. Consistent with discussion above, assume that the maximum amount of cache used to store hash table entries and chunks used in connection with deduplication is 10 GB. In this case, in order for duplicates to be detected beginning at point P2, location 55 GB, deduplication processing may be enabled for a "window" prior to P2 where the window has a size equal to 10 GB, the maximum amount of cache used to store hash tables entries and chunks used with deduplication. In this example, deduplication may be enabled when writing to the data set beginning with logical address or offset location 45 GB (e.g., 55 GB−10 GB=45 GB) in efforts to facilitate loading the cache with chunks that may be subsequently detected as duplicates beginning at location 55 GB.

In a manner similar to that as discussed above, such as in connection with FIGS. 8A-C and 9, processing may be performed periodically to reassess and adapt data deduplication settings. For example, data deduplication information of FIG. 10 may be obtained at various successive time periods such as described above in order to continuously assess and dynamically determine and adapt suitable data deduplication settings (e.g., enable or disable) for portions of a data set at different points in time. Such reassessment at the end of a time period may be based on writes written to the data set during the time period.

In at least one embodiment, a data set may be partitioned into portions and processing as described herein may be performed periodically, such as at fixed time periods, for each portion. For example, a data set may be 100 GB and the data set may be partitioned into 10 GB portions (each portion having a different subrange of sequential logical addresses or locations in the 100 GB data set). Processing may be performed to obtain a new set of compression information (e.g., such as in any of FIGS. 8A-C) and a new set of data deduplication information (e.g., such as in any of FIGS. 9 and 10) for each 10 GB data portion at each time period. In at least one embodiment, a snapshot may be taken at each time period of each data set, or each data portion thereof, for which data reduction options and settings are being determined. For example, referring back to the 100 GB data set having 10 10 GB portions, snapshots may be taken of each of the 10 10 GB portions at every time period. A snapshot of a particular 10 GB portion for a particular time period may capture writes directed to the particular 10 GB portions occurring during the particular time period. In this manner, an embodiment in accordance with techniques herein may independently determine compression information and deduplication information for each 10 GB portion and determine compression and deduplication settings or options for each 10 GB portion for each time period. Additionally, taking a snapshot of each 10 GB portion allows for performing such processing and generating compression information and deduplication information offline on a static version of a snapshot of the 10 GB portion. Furthermore in at least one embodiment, such processing and generating compression information and deduplication information performed offline on a static version of a snapshot of the 10 GB portion (e.g., while no I/O is issued to the snapshot) may be performed on a different device, system or component without consuming CPU resources that would otherwise be used in connection with servicing I/Os of the data storage system. Thus, such processing and generating compression information and deduplication information performed offline on a static version of the 10 GB portion may be done without adversely impacting data storage system performance of I/Os.

As known in the art, a snapshot may be characterized as a point in time logical image of data. In connection with LUNs, or more generally any suitable storage entity, software of a data storage system may provide one or more data replication services or facilities whereby a snapshot is one such facility. A snapshot may be made with respect to a source storage entity, such as a LUN, thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. A snapshot of a LUN is a virtual point in time copy and requires access to the unchanged data in the source LUN. Therefore failures affecting the source LUN also affect the snapshot of the LUN. Snapshots of a LUN may be contrasted, for example, with bit-for-bit replica data copies of a source LUN. Generally, snapshots may be taken as logical point in time copies of any suitable storage entity, such as one or more file systems, one or more directories, one or more files, a database, and the like (e.g., such as a data set as described herein).

In at least one embodiment as described herein, processing may be performed to analyze a data set that was written on the storage by taking snapshots of the data layout at fixed intervals (e.g., minutes or hours apart) and accordingly selecting whether to enable/disable each of compression and deduplication based on such analysis, such as according to different portions or regions of the data set. Using this method both compression and deduplication may be disabled when the benefits in terms of storage savings (e.g., using compression alone, deduplication alone, or both compression and deduplication) are less than a specified threshold or target value, such as 10%. For example, with reference back to FIG. 4 as well as the Venn diagrams of FIGS. 5 and 6, if no data reduction technique or combination of such techniques results in at least a 10% storage savings for a data set or portion thereof, all data reduction techniques may be disabled for the data set, or portion thereof.

In connection with performing a reassessment and periodically and dynamically determining revised compression information and deduplication information on a continuous basis at different time periods, an embodiment may additionally display a Venn diagram to users with such revised information with respect to writes to the data set (or portion thereof) made during each time period. Consistent with other description herein, in at least one embodiment, a recommendation of whether to disable or enable compression and whether to disable or enable deduplication for a data set may be determined using techniques herein and presented to a user, where the user may provide input confirming to proceed with the recommendations, or other overriding the recommendations with different options and settings. In at least one embodiment, whether to disable or enable compression and whether to disable or enable deduplication for a data set may be determined using techniques herein and placed into effect automatically without requiring further user input or selection.

Referring to FIG. 11, shown is a flowchart of processing steps that may be performed in an embodiment in accordance with techniques herein. The flowchart 1000 summarizes processing as described above that may be performed in an embodiment in accordance with techniques herein for a data set. Consistent with discussion herein where a data set may be partitioned into multiple logical portions each having a different subrange or sequential logical address locations in the data set, such processing of 1000 may be performed with respect to each individual portion of the data set. At step 1002, initial compression information may be obtained for a data set. Step 1002 may include, for example, obtaining compression information as described in connection with one or more of FIGS. 8A-8C. From step 1002, control proceeds to step 1004. At step 1004, initial deduplication information may be obtained for the data set. Step 1004 may include, for example, obtaining compression information as described in connection with FIGS. 9 and 10. From step 1004, control proceeds to step 1006. At step 1006, processing is performed to determine whether to enable or disable compression for data set (or particular portions of the data set), and whether to enable or disable data deduplication processing for the data set (or particular portions of the data set) in accordance with the compression information and deduplication information obtained, respectively, in steps 1002 and 1004. In at least one embodiment, step 1006 may including displaying a Venn diagram for a data set as described herein, for example, in connection with FIGS. 3, 5 and 6 based on the compression information and deduplication information for the data set (e.g., obtained in connection with steps 1002 and 1004). Additionally, in at least one embodiment, determining settings of enablement/disablement for each of compression and deduplication may be made automatically in step 1006. In at least one embodiment, determining settings of enablement/disablement for each of compression and deduplication in step 1006 may include displaying recommendations to the user based on the compression and deduplication information where the user may confirm selection of such settings, or may otherwise override such settings with revised settings/options.

From step 1006, processing continues with step 1008 where the settings or options of enabling/disabling compression and enabling/disabling deduplication may be effective for a subsequent time period during which writes are issued to the data set. From step 1008 control proceeds to step 1010. At step 1010, after the time period during which writes are issued to the data set, processing may be performed to determine revised compression information and revised data deduplication information for the data set based on the writes to the data set during the time period. Step 1010 may include determining revised versions of the compression information (e.g., FIGS. 8A-8C) and deduplication information (e.g., FIGS. 9-10) based on writes to the data set during the elapsed time period. From step 1010, control proceeds to step 1012. At step 1012, processing is performed to determine whether to enable or disable compression for data set (or particular portions of the data set), and whether to enable or disable data deduplication processing for the data set (or particular portions of the data set) in accordance with the compression information and deduplication information obtained in step 1012. In at least one embodiment, step 1012 may including displaying a Venn diagram for a data set as described herein, for example, in connection with FIGS. 3, 5 and 6 based on the compression information and deduplication information for the data set (e.g., obtained in connection with step 1012 for writes to the data set during the time period). Additionally, in at least one embodiment, determining settings of enablement/disablement for each of compression and deduplication may be made automatically in step 1012. In at least one embodiment, determining settings of enablement/disablement for each of compression and deduplication in step 1010 may include displaying recommendations to the user based on the compression and deduplication information where the user may confirm selection of such settings, or may otherwise override such settings with revised settings/options. From step 1012, control proceeds to step 1008.

The techniques herein may be implemented using any suitable hardware and/or software, such as executing code using a processor where the code is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable. The processor may be any suitable processor such as, for example, a processor of a computer, data storage system, or other component, such as an ASIC (application specified integrated circuit).

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining data reduction options for data sets comprising:
   receiving first data reduction information for a data set, wherein the first data reduction information includes first compression information regarding compression of chunks of the data set, wherein the first data reduction information includes first deduplication information regarding deduplication of chunks of the data set;
   determining, in accordance with the first data reduction information for the data set, first settings denoting whether compression is enabled or disabled for the data set and denoting whether deduplication is enabled or disabled for the data set;
   receiving, during a first time period when the first settings are effective, a plurality of writes directed to the data set, wherein the plurality of writes modify a plurality of chunks of the data set;
   receiving second data reduction information for the data set, wherein the second data reduction information includes second compression information regarding compression of the plurality of chunks of the data set modified by the plurality of writes during the first time period, wherein the second data reduction information includes second deduplication information regarding deduplication of the plurality of chunks of the data set modified by the plurality of writes during the first time period; and
   determining, in accordance with the second data reduction information for the data set, second settings denoting whether compression is enabled or disabled for the data set and denoting whether deduplication is enabled or disabled for the data set.

2. The method of claim 1, further comprising:
   receiving, during a second time period when the second settings are effective, a second plurality of writes directed to the data set, wherein the second plurality of writes modify a second plurality of chunks of the data set;
   receiving third data reduction information for the data set, wherein the third data reduction information includes third compression information regarding compression of the second plurality of chunks of the data set modified by the second plurality of writes during the second time period, wherein the third data reduction information includes third deduplication information regarding deduplication of the second plurality of chunks of the data set modified by the second plurality of writes during the second time period; and
   determining, in accordance with the third data reduction information for the data set, third settings denoting whether compression is enabled or disabled for the data set and denoting whether deduplication is enabled or disabled for the data set.

3. The method of claim 1, wherein the first compression information includes a histogram denoting frequencies of different compressed chunk sizes in the data set; and wherein the second compression information includes a histogram denoting frequencies of different compressed chunk sizes for the first plurality of chunks modified by the first plurality of writes during the first time period.

4. The method of claim 1, wherein the first compression information identifies compressed chunk sizes for chunks at different logical locations or offsets in the data set, and wherein the second compression information includes identifies compressed chunk sizes for the first plurality of chunks modified by the first plurality of writes during the first time period.

5. The method of claim 1, wherein the first deduplication information includes a histogram denoting frequencies of duplicates at different logical locations or offsets in the data set, and wherein the second deduplication information includes a histogram denoting frequencies of duplicates at different logical locations or offsets in the data set modified by the first plurality of writes during the first time period.

6. The method of claim 1, wherein deduplication when enabled is performed as processing of an I/O path when writing to the data set.

7. The method of claim 1, wherein compression when enabled is performed as processing of the I/O path when writing to the data set.

8. The method of claim 1, wherein deduplication when enabled is not performed as processing of an I/O path when writing to the data set.

9. The method of claim 1, wherein compression when enabled is not performed as processing of the I/O path when writing to the data set.

10. The method of claim 1, further comprising:
displaying, on a user interface at a first point in time based on the first data reduction information, a diagram illustrating data reduction benefits for the data set;
providing, in accordance with the first data reduction information for the data set, recommended data reduction options for the data set; and
receiving, via the user interface, a first input identifying the first settings as current data reduction options selected for the data set.

11. The method of claim 10, further comprising:
displaying, on the user interface at a second point in time based on the second data reduction information, a diagram illustrating revised data reduction benefits for the data set based on chunks modified by the first plurality of writes in the first time period
providing, in accordance with the second data reduction information for the data set, recommended data reduction options for the data set; and
receiving, via the user interface, a second input identifying the second settings as revised data reduction options selected for the data set.

12. The method of claim 1, wherein the first settings indicate, for each of a plurality of data portions of the data set, whether compression is enabled or disabled individually for said each portion and whether deduplication is enabled or disabled individually for said each portion.

13. The method of claim 1, wherein the data set is a first data set included as a first portion of a second data set larger than the first data set, and the method includes:
partitioning the second data set into a plurality of portions each having a different logical address subrange of locations in the second data set.

14. The method of claim 1, further comprising:
taking a snapshot of the data set at the end of the first time period, wherein the snapshot is a point in time logical copy of the data set at the end of the first time period after the plurality of writes are issued to the data set; and
determining the second reduction information using the snapshot of the data set.

15. A system comprising:
a processor; and
a memory comprising code stored thereon that, when executed, perform a method of determining data reduction options for data sets comprising:
receiving first data reduction information for a data set, wherein the first data reduction information includes first compression information regarding compression of chunks of the data set, wherein the first data reduction information includes first deduplication information regarding deduplication of chunks of the data set;
determining, in accordance with the first data reduction information for the data set, first settings denoting whether compression is enabled or disabled for the data set and denoting whether deduplication is enabled or disabled for the data set;
receiving, during a first time period when the first settings are effective, a plurality of writes directed to the data set, wherein the plurality of writes modify a plurality of chunks of the data set;
receiving second data reduction information for the data set, wherein the second data reduction information includes second compression information regarding compression of the plurality of chunks of the data set modified by the plurality of writes during the first time period, wherein the second data reduction information includes second deduplication information regarding deduplication of the plurality of chunks of the data set modified by the plurality of writes during the first time period; and
determining, in accordance with the second data reduction information for the data set, second settings denoting whether compression is enabled or disabled for the data set and denoting whether deduplication is enabled or disabled for the data set.

16. A computer readable medium comprising code stored thereon that, when executed, performs a method of determining data reduction options for data sets comprising:
receiving first data reduction information for a data set, wherein the first data reduction information includes first compression information regarding compression of chunks of the data set, wherein the first data reduction information includes first deduplication information regarding deduplication of chunks of the data set;
determining, in accordance with the first data reduction information for the data set, first settings denoting whether compression is enabled or disabled for the data set and denoting whether deduplication is enabled or disabled for the data set;
receiving, during a first time period when the first settings are effective, a plurality of writes directed to the data set, wherein the plurality of writes modify a plurality of chunks of the data set;
receiving second data reduction information for the data set, wherein the second data reduction information includes second compression information regarding compression of the plurality of chunks of the data set modified by the plurality of writes during the first time period, wherein the second data reduction information includes second deduplication information regarding deduplication of the plurality of chunks of the data set modified by the plurality of writes during the first time period; and determining, in accordance with the second data reduction information for the data set, second settings denoting whether compression is enabled or disabled for the data set and denoting whether deduplication is enabled or disabled for the data set.

17. The computer readable medium of claim 16, wherein the method further comprises:

receiving, during a second time period when the second settings are effective, a second plurality of writes directed to the data set, wherein the second plurality of writes modify a second plurality of chunks of the data set;

receiving third data reduction information for the data set, wherein the third data reduction information includes third compression information regarding compression of the second plurality of chunks of the data set modified by the second plurality of writes during the second time period, wherein the third data reduction information includes third deduplication information regarding deduplication of the second plurality of chunks of the data set modified by the second plurality of writes during the second time period; and determining, in accordance with the third data reduction information for the data set, third settings denoting whether compression is enabled or disabled for the data set and denoting whether deduplication is enabled or disabled for the data set.

18. The computer readable medium of claim 16, wherein the first compression information includes a histogram denoting frequencies of different compressed chunk sizes in the data set; and wherein the second compression information includes a histogram denoting frequencies of different compressed chunk sizes for the first plurality of chunks modified by the first plurality of writes during the first time period.

19. The computer readable medium of claim 16, wherein the first compression information identifies compressed chunk sizes for chunks at different logical locations or offsets in the data set, and wherein the second compression information includes identifies compressed chunk sizes for the first plurality of chunks modified by the first plurality of writes during the first time period.

20. The computer readable medium of claim 16, wherein the first deduplication information includes a histogram denoting frequencies of duplicates at different logical locations or offsets in the data set, and wherein the second deduplication information includes a histogram denoting frequencies of duplicates at different logical locations or offsets in the data set modified by the first plurality of writes during the first time period.

\* \* \* \* \*